United States Patent [19]

Weisshaar et al.

[11] Patent Number: 4,754,395
[45] Date of Patent: Jun. 28, 1988

[54] NETWORK INTERFACE MODULE WITH MINIMIZED DATA PATHS

[75] Inventors: Bernhard P. Weisshaar, Toronto; Michael Barnea, Willowdale, both of Canada

[73] Assignee: Computer X, Inc., Kent, Wash.

[21] Appl. No.: 730,621

[22] Filed: May 6, 1985

[51] Int. Cl.$^4$ .............................................. G06F 13/00
[52] U.S. Cl. .................................... 364/200; 364/300
[58] Field of Search ... 364/200 MS File, 900 MS File; 340/822.05

[56] References Cited

U.S. PATENT DOCUMENTS

| | | | |
|---|---|---|---|
| 3,810,100 | 5/1974 | Hungerford et al. | 364/900 |
| 4,007,450 | 2/1977 | Haibt et al. | 364/200 |
| 4,031,512 | 6/1977 | Faber | 364/200 |
| 4,325,120 | 4/1982 | Colley et al. | 364/200 |

OTHER PUBLICATIONS

J. G. Sams, Node Processor for Distributed System Control, IBM Tech. Disclosure Bulletin, vol. 23, No. 5, Oct. 1980, pp. 1811-1812.
R. C. Summers, C. Wood, Message-Based Protocol for Interprocessor Communication, IBM Tech. Disc. Bulletin, vol. 22, No. 7, Dec. 1979, pp. 2893-2895.

*Primary Examiner*—Thomas M. Heckler
*Assistant Examiner*—Debra A. Chun
*Attorney, Agent, or Firm*—Walter W. Nielsen

[57] ABSTRACT

A multi-processor, multi-tasking virtual machine comprises processes, messages, and contexts. Processes communicate only through messages. Contexts are groups of related processes. The virtual machine is implemented in a distributed data processing system comprising a plurality of individual cells coupled by a local area network (LAN). Each cell may comprise one or more processes and/or contexts.

A network interface module (NIM) provides the interface between any individual cell and the LAN. To facilitate message transmission between processes resident on different cells, each NIM is provided with tables identifying the locations of resident and non-resident processes, respectively. Cells may be added to or deleted from the LAN without disrupting the LAN operations.

11 Claims, 6 Drawing Sheets

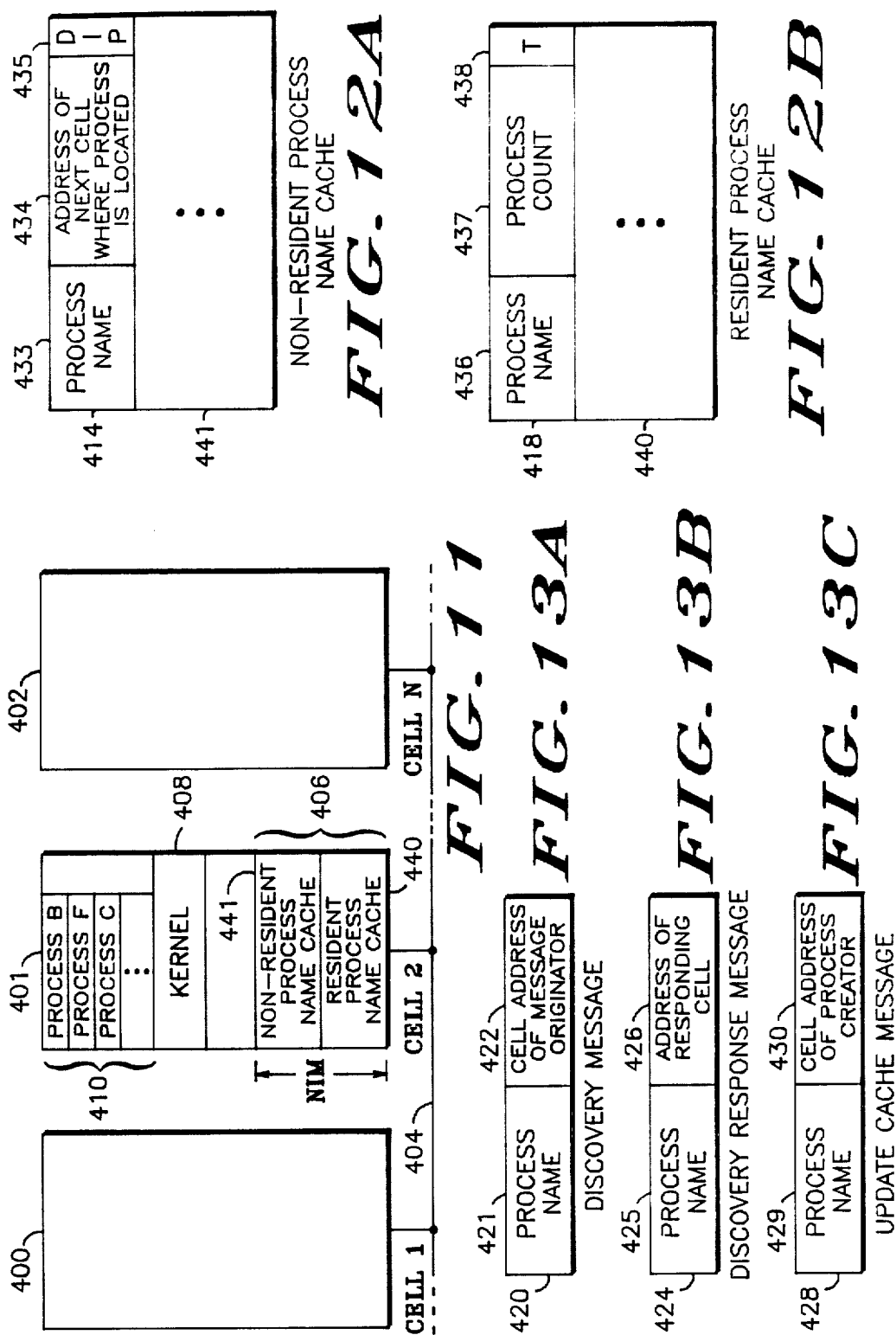

NETWORK INTERFACE MODULE WITH MINIMIZED DATA PATHS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED INVENTIONS

The present invention is related to the following inventions, filed on even date herewith, all assigned to the assignee of the present invention:

1. Title: Nested Contexts in a Virtual Single Machine; Inventors: Andrew Kun, Frank Kolnick, and Bruce Mansfield; Ser. No.: 730,903.

2. Title: Computer System With Data Residency; Transparency and Data Access Transparency Inventors: Bruce Mansfield, Frank Kolnick, and Andrew Kun; Ser. No.: 730,929 (which is the parent of U.S. application Ser. No. 07/110,614).

3. Title: Method of Inter-Process Communication in a Distributed Data Processing System; Inventors: Bernard Weisshaar, Frank Kolnick, Andrew Kun, and Bruce Mansfield; Ser. No.: 730,892 (now U.S. Pat. No. 4,694,396).

4. Title: Logical Ring in a Virtual Single Machine; Inventors: Andrew Kun, Frank Kolnick, and Bruce Mansfield; Ser. No.: 730,923.

5. Title: Virtual Single Machine With Message-Like Hardware Interrupts and Processor Exceptions; Inventors: Andrew Kun, Frank Kolnick, and Bruce Mansfield; Ser. No.: 730,922.

TECHNICAL FIELD

This invention relates generally to digital data processing, and, in particular, to a network interface module (NIM) in a distributed data processing system, in which the NIM comprises means for facilitating message transmission between processes resident on different cells in the network.

BACKGROUND OF THE INVENTION

The present invention is implemented in a distributed data processing system—that is, two or more data processing systems which are capable of functioning independently but which are so coupled as to send and receive messages to and from one another.

A Local Area Network (LAN) is an example of a distributed data processing system. A typical LAN comprises a number of autonomous data processing "cells", each comprising at least a processor and memory. Each cell is capable of conducting data processing operations independently. In addition, each cell is coupled (by appropriate means such as a twisted wire pair, coaxial cable, fiber optic cable, etc.) to a network of other cells which may be, for example, a loop, star, tree, etc., depending upon the design considerations.

As mentioned above, the present invention finds utility in such a distributed data processing system, since there is a significant need in such a system for a relatively great degree of hardware independence. Typical distributed data processing systems comprise a large variety of diverse processors, memories, operator interfaces, printers, and other peripherals. Thus there is an urgent need to provide an operating system for such a distributed data processing system, which operating system will easily accommodate different types of hardware devices without the necessity of writing and/or rewriting large portions of such operating system each time a device is added or removed from the system.

A "process", as used within the present invention, is defined as a self-contained package of data and executable procedures which operate on that data, comparable to a "task" in other known systems. Within the present invention a process can be thought of as comparable to a subroutine in terms of size, complexity, and the way it is used. The difference between processes and subroutines is that processes can be created and destroyed dynamically and can execute concurrently with their creator and other "subroutines".

Within a process, as used in the present invention, the data is totally private and cannot be accessed from the outside, i.e., by other processes. Processes can therefore by used to implement "objects", "modules", or other higher-level data abstractions. Each process executes sequentially. Concurrency is achieved through multiple processes, possibly executing on multiple processors.

Every process in the distributed data processing system of the present invention has a unique identifier (PID) by which it can be referenced. The PID is assigned by the system when the process is created, and it is used by the system to physically locate the process.

Every process also has a non-unique, symbolic "name", which is a variable-length string of characters. In general, the name of a process is known system-wide. To restrict the scope of names, the present invention utilizes the concept of a "context".

A "context" is simply a collection of related processes whose names are not known outside of the context. Contexts partition the name space into smaller, more manageable subsystems. They also "hide" names, ensuring that processes contained in them do not unintentionally conflict with those in other contexts.

A process in one context cannot explicitly communicate with, and does not know about, processes inside other contexts. All interaction across context boundaries must be through a "context process", thus providing a degree of security. The context process often acts as a switchboard for incoming messages, rerouting them to the appropriate sub-processes in its context.

A context process behaves like any other process and additionally has the property that any processes which it creates are known only to itself and to each other. Creation of the process constitutes definition of a new context with the same name as the process.

Any process can create context processes. Each new context thus defined is completely contained inside the context in which it was created and therefore is shielded from outside reference. This "nesting" allows the name space to be structured hierarchically to any desired depth.

Conceptually, the highest level in the hierarchy is the system itself, which encompasses all contexts. Nesting is used in top-down design to break a system into components or "layers", where each layer is more detailed than the preceding one. This is analogous to breaking a task down into subroutines, and in fact many applications which are single tasks on known systems may translate to multiple processes in nested contexts.

A "message" is a buffer containing data which tells a process what to do and/or supplies it with information it needs to carry out its operation. Each message buffer can have a different length (up to 64 kilobytes). By convention, the first field in the message buffer defines the type of message (e.g., "read", "print", "status", "event", etc.).

Messages are queued from one process to another by name or PID. Queuing avoids potential synchronization problems and is used instead of semaphores, monitors, etc. The sender of a message is free to continue after the message is sent. When the receiver attempts to get a message, it will be suspended until one arrives if none are already waiting in its queue. Optionally, the sender can specify that it wants to wait for a reply and is suspended until that specific message arrives. Messages from any other source are not dequeued until after that happens.

Within the distributed data processing system described herein, messages are the only way for two processes to exchange data. There is no concept of a "global variable". Shared memory areas are not allowed, other than through processes which essentially "manage" each area by means of messages. Messages are also the only form of dynamic memory that the system handles. A request to allocate memory therefore returns a block of memory which can be used locally by the process but can also be transmitted to another process.

Messages provide the mechanism by which hardware transparency is achieved. A process located anywhere in the system may send a message to any other process anywhere else in the system (even on another processor and/or cell) if it knows the process name. This means that processes can be dynamically distributed across the system at any time to gain optimal throughput without changing the processes which reference them. Resolution of destinations is done by searching the process name space.

The context nesting level determines the "scope of reference" when sending messages between processes by name. From a given process, a message may be sent to all processes at its own level (i.e., in the same context) and (optionally) to any arbitrary higher level. The contexts are searched from the current context upward until a match is found. All processes with the given name at that level are then sent a copy of the message. A process may also send a message to itself or to its parent (the context process) without knowing either name explicitly, permitting multiple instances of a process to exist in different contexts, with different names.

Sending messages by PID obviates the need for a name search and ignores context boundaries. This is the most efficient method of communicating.

There is a significant need to be able to provide within a distributed data processing system the ability to easily add and delete individual cells in the network(s) without disrupting network operations.

There is also a significant need to be able to communicate easily and quickly between processes which may be resident either in the same cell or in different cells, in a manner which is transparent to the user.

BRIEF SUMMARY OF INVENTION

Accordingly, it is an object of the present invention to provide a distributed data processing system having an improved network interface.

It is also an object of the present invention to provide an improved network interface which facilitates message transmission between processes resident on different cells.

It is another object of the present invention to provide an improved network interface which facilitates the addition to and deletion from the network of individual cells without disrupting network operations.

It is yet another object of the present invention to provide an improved network interface which facilitates the location of processes resident on different cells.

It is still another object of the present invention to provide an improved network interface which facilitates the identification of processes located on any given cell.

These and other objects are achieved in accordance with a preferred embodiment of the invention by providing a method of communicating between processes in a distributed data processing system, the system comprising a plurality of individual cells and at least two processes resident on different ones of the cells, the method comprising the steps of providing in at least a first one of the cells a table of non-resident processes; generating a request by a first process in the first cell to transmit a message to a second process identified only by name, the second process not resident on the first cell; looking up the location of the second process in the table in the first cell; and transmitting the message to the cell containing the second process.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 11 shows a conceptual view of the local area network (LAN), including several cells, and a representational view of a network interface module (NIM).

FIG. 12A shows a representation of the NIM's non-resident process name cache, and FIG. 12B shows a representation of the NIM's resident process name cache.

FIG. 13A shows the format of a discovery message.

FIG. 13B shows the format of a discovery response message.

FIG. 13C shows the format of an update cache message.

OVERVIEW OF COMPUTER SYSTEM

Figure 1:
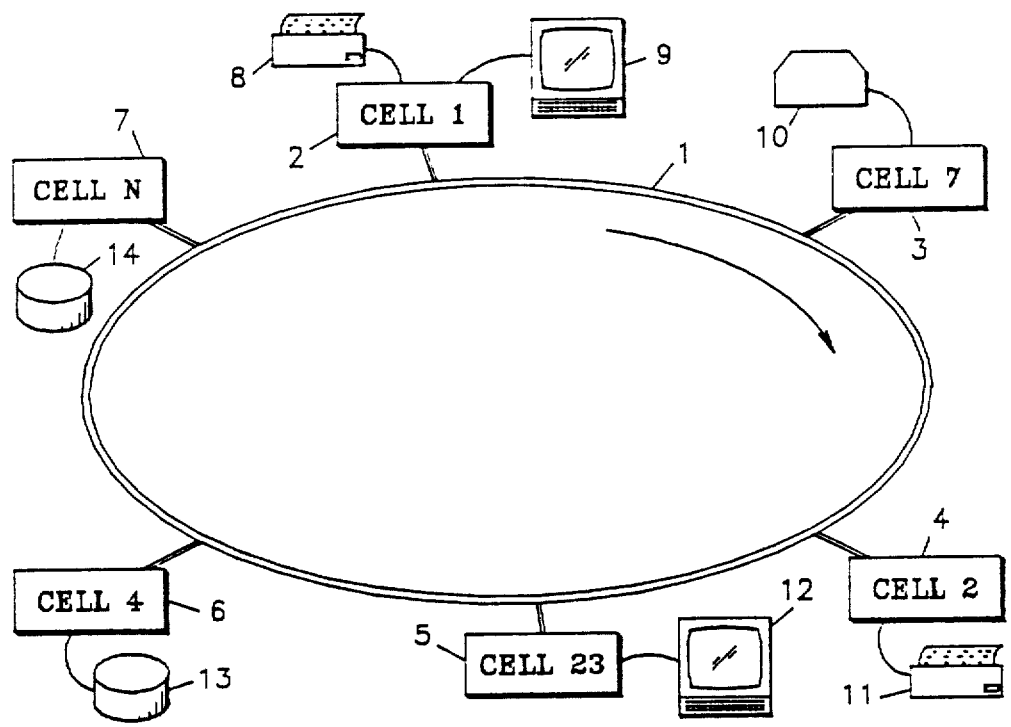
FIG. 1 shows a representational illustration of a single network, distributed data processing system incorporating the improved data management system of the present invention.

With reference to FIG. 1, a distributed computer configuration is shown comprising multiple cells 2-7 (nodes) loosely coupled by a local area network (LAN) 1. The number of cells which may be connected to the network is arbitrary and depends upon the user application. Each cell comprises at least a processor and memory, as will be discussed in greater detail with reference to FIG. 2 below. In addition, each cell may also include other units, such as a printer 8, operator display module (ODM) 9, mass memory module 13, and other I/O device 10.

Figure 2:
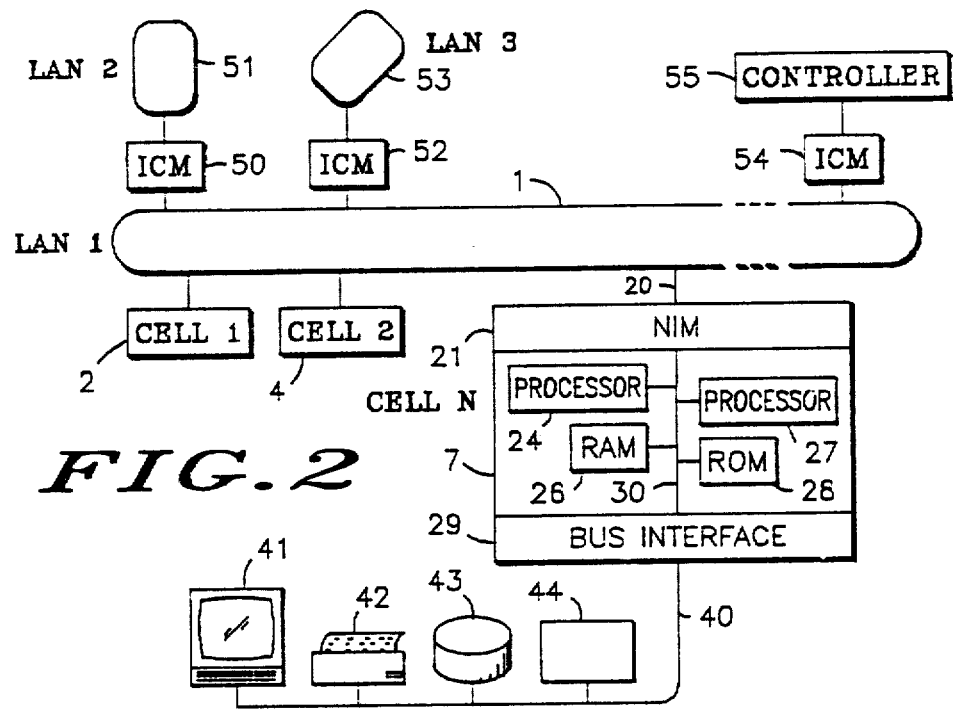
FIG. 2 shows a block diagram illustrating a multiple-network, distributed data processing system incorporating the improved data management system of the present invention.

With reference now to FIG. 2, a multiple-network distributed computer configuration is shown. A first local area network LAN 1 comprises several cells 2,4,and 7. LAN 1 is coupled to a second local area network LAN 2 by means of an Intelligent Communications Module (ICM) 50. The Intelligent Communications Module provides a link between the LAN and other networks and/or remote processors (such as programmable controllers).

LAN 2 may comprise several cells (not shown) and may operate under the same LAN protocol as that of the present invention, or it may operate under any of several commercially available protocols, such as Ethernet; MAP, the Manufacturing Automation Protocol of General Motors Corp; Systems Network Architecture (SNA) of International Business Machines, Inc.; SECS-II; etc. Each ICM 50 is programmable for carrying out one of the above-mentioned specific protocols. In addition, the basic processing module of the cell itself can be used as an intelligent peripheral controller (IPC) for specialized devices.

LAN 1 is additionally coupled to a third local area network LAN 3 via ICM 52. A process controller 55 is also coupled to LAN 1 via ICM 54.

A representative cell N (7, FIG. 2) comprises a processor 24 which, in a preferred embodiment, is a Motorola 68010 processor. Each cell further includes a read only memory (ROM) 28 and a random access memory (RAM) 26. In addition, each cell includes a Network Interface Module (NIM) 21, which connects the cell to the LAN, and a Bus Interface 29, which couples the cell to additional devices within a cell. While a minimal cell is capable of supporting two peripheral devices, such as an Operator Display Module (ODM) 41 and an I/O Module 44, additional devices (including additional processors, such as processor 27) can be provided within a cell. Other additional devices may comprise, for example, a printer 42, and a mass-storage module 43 which supports a hard disk and a back-up device (floppy disk or streaming tape drive).

The Operator Display Module 41 provides a keyboard and screen to enable an operator to input information and receive visual information.

While a single cell may comprise all of the above units, in the typical user application individual cells will normally be dedicated to specialized functions. For example, one or more mass storage cells may be set up to function as data base servers. There may also be several operator consoles and at least one cell for generating hard-copy printed output. Either these same cells, or separate dedicated cells, may execute particular application programs.

The system is particularly designed to provide an intergrated solution for factory automation, data acquisition, and other real-time applications. As such, it includes a full complement of services, such as a graphical output, windows, menus, icons, dynamic displays, electronic mail, event recording, and file management. Software development features include compilers, a window-oriented editor, a debugger, and performance-monitoring tools.

Local Area Network

The local area network, as depicted in either FIG.1 or FIG. 2, ties the entire system together and makes possible the distributed virtual machine model described below. The LAN provides high throughput, guaranteed response, reliability, and low entry cost. The LAN is also autonomous, in the sense that all system and applications software is unaware of its existence. For example, any Network Interface Module (e.g. NIM 21, FIG. 2) could be replaced without rewriting any software other than that which directly drives it.

The LAN interconnection medium may be twisted-pair or coaxial cable. Two channels (logically, two distinct networks) may be provided for reliability and for increased throughput.

The LAN architecture is a logical ring, in which an electronic "token" is constantly passed from cell to cell at high speed. The current holder of the token may use it to send a "frame" of data or may pass it on to the next cell in the ring. The NIM only needs to know the logical address and status of its immediately succeeding neighbor. The NIM's responsibility is limited to detecting the failure of that neighbor or the inclusion of a new neighbor. In general, adjustment to failed or newly added cells is automatic.

The network interface maps directly into the processor's memory. Data exchange occurs through a dual-ported buffer pool which contains a linked list of pending "frames". Logical messages, which vary in length, are broken into fixed-size frames for transmission and are reassembled by the receiving NIM. Frames are sequence-numbered for this purpose. If a frame is not acknowledged within a short period of time, it is retransmitted a number of times before being treated as a failure.

As described above with reference to FIG. 2, the LAN may be connected to other LAN's operating under the same LAN protocol via socalled "bridgeways", or it may be connected to other types of LAN's via "gateways".

Software Model

The computer operating system of the present invention operates upon processes, messages, and contexts, as such terms are defined herein. Thus this operating system offers the programmer a hardware abstraction, rather than a data or control abstraction.

Processes are referenced without regard to their physical location via a small set of message-passing primitives. As mentioned earlier, every process has both a unique system-generated identifier and a not necessarily unique name assigned by the programmer. The identifier provides quick direct access, while the name has a limited scope and provides symbolic, indirect access.

Figure 3:
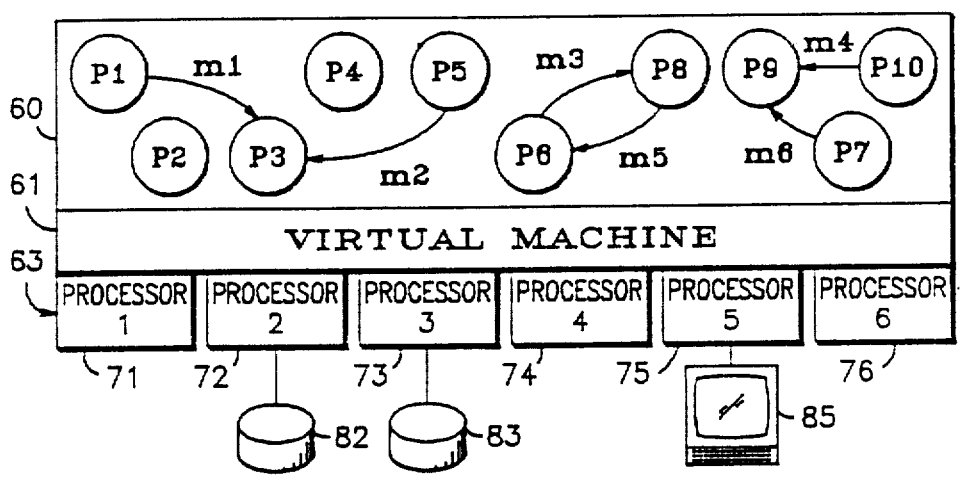
FIG. 3 shows an architectural model of a data processing system incorporating the present invention.

With reference to FIG. 3, an architectural model of the present invention is shown. The bottom, or hardware, layer 63 comprises a number of processors 71-76, as described above. The processors 71-76 may exist physically within one or more cells. The top, or software, layer 60 illustrates a number of processes P1-P10 which send messages m1-m6 to each other. The middle layer 61, labelled "virtual machine", isolates the hardware from the software, and it allows programs to be written as if they were going to be executed on a single processor. Conversely, programs can be distributed across multiple processors without having been explicitly designed for that purpose.

An important purpose of the virtual machine concept herein-disclosed is to provide the applications programmer with a simple, consistent model in which to design his system. This model, as mentioned above, is reduced to several elemental concepts: processes, messages, and contexts. As a consequence of this elemental model, hardware peculiarities are made transparent to the user, and changes in hardware configurations have no direct effect on the software.

The Virtual Machine

As discussed earlier, a "process" is a self-contained package of data and executable procedures which operate on that data. The data is totally private and cannot be accessed by other processes. There is no concept of shared memory within the present invention. Execution of a process is strictly sequential. Multiple processes execute concurrently and must be scheduled by the operating system. The processes can be re-entrant, in which case only one copy of the code is loaded even if multiple instances are active.

Every process has a unique "process identifier number" (PID) by which it can be referenced. The PID is assigned by the system when the process is created and remains in effect until the process terminates. The PID assignment contains a randomizing factor which guarantees that the PID will not be re-used in the near future. The contents of the PID are irrelevant to the programmer but are used by the virtual machine to physically locate the process. A PID may be thought of as a "pointer" to a process.

Every process also has a "name" which is a variable-length string of characters assigned by the programmer. A name need not be unique, and this ambiguity may be used to add new services transparently and to aid in fault-tolerance.

Figure 4:
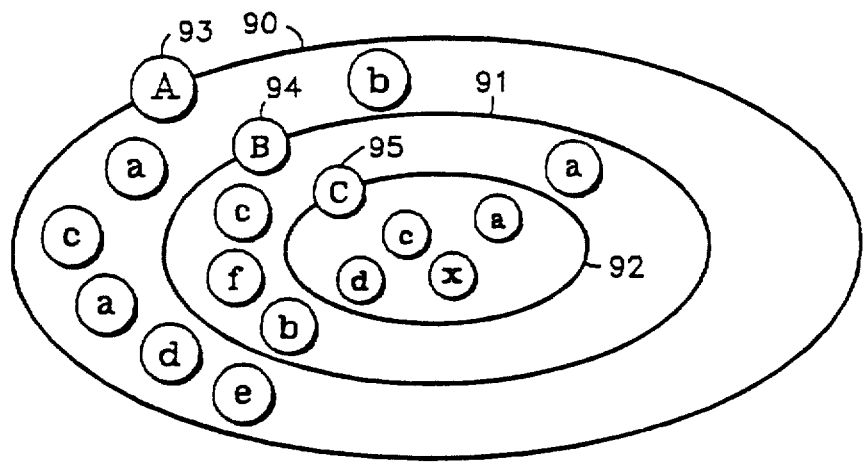
FIG. 4 shows the relationship between software contexts and processes as they relate to the present invention.

FIG. 4 illustrates that the system-wide name space is partitioned into distinct subsets by means of "contexts" identified by reference numerals 90-92. A context is simply a collection of related processes whose names are not known outside of the context. Context 90, for example, contains processes A, a, a, b, c, d, and e. Context 91 contains processes B, a, b, c, and f. And context 92 contains processes C, a, c, d, and x.

One particular process in each context, called the "context process", is known both within the context and within the immediately enclosing one (referred to as its "parent context"). In the example illustrated in FIG. 4, processes A-C are context processes for contexts 90-92, respectively. The parent context of context 91 is context 90, and the parent context of context 92 is context 91. Conceptually, the context process is located on the boundary of the context and acts as a gate into it.

Processes inside context 92 can reference any processes inside contexts 90 and 91 by name. However, processes in context 91 can only access processes in context 92 by going through the context process C. Processes in context 90 can only access processes in context 92 by going through context processes B and C.

The function of the context process is to filter incoming messages and either reject them or reroute them to other processes in its context. Contexts may be nested, allowing a hierarchy of abstractions to be constructed. A context must reside completely on one cell. The entire system is treated as an all-encompassing context which is always present and which is the highest level in the hierarchy. In essence, contexts define localized protection domains and greatly reduce the chances of unintentional naming conflicts.

If appropriate, a process inside one context can be "connected" to one inside another context by exchanging PID's, once contact has been established through one or the other of the context processes. Most process servers within the present invention function that way. Initial access is by name. Once the desired function (such as a window or file) is "opened", the user process and the service communicate directly via PID's.

A "message" is a variable-length buffer (limited only by the processor's physical memory size) which carries information between processes. A header, inaccessible to the programmer, contains the destination name and the sender's PID. By convention, the first field in a message is a null-terminated string which defines the type of message (e.g., "read", "status", etc.). Messages are queued to the receiving process when they are sent. Queuing ensures serial access and is used in preference to semaphores, monitors, etc.

As mentioned above, messages provide the mechanism by which hardware transparency is achieved. A process located anywhere in the virtual machine can send a message to any other process if it knows its name. Transparency applies with some restrictions across bridgeways (i.e., the interfaces between LAN's operating under identical network protocols) and, in general, not at all across gateways (i.e, the interfaces between LAN's operating under different network protocols) due to performance degradation. However, they could so operate, depending upon the required level of performance.

Figure 5:
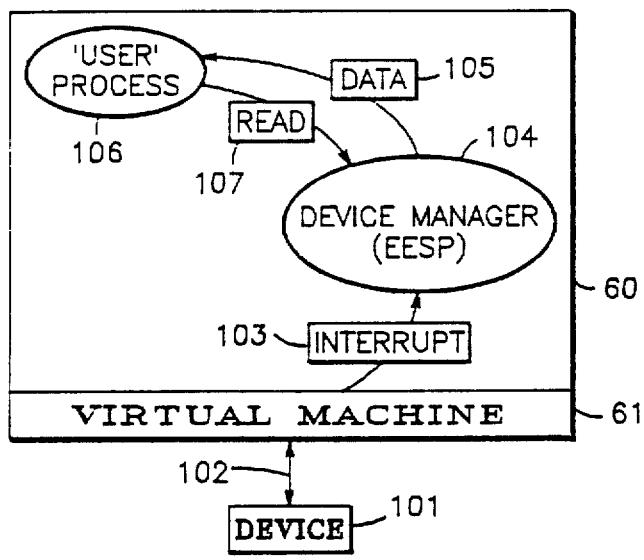
FIG. 5 shows the relationship between external events and processes.

With reference to FIG. 5, the relationship of external events to processes will now be described. The virtual machine makes devices look like processes. For example, when an interrupt occurs in an external device 101, the virtual machine kernel 61 queues an interrupt message 103 to a specific process 104, known as an "external event service process" (EESP), functioning as the device manager. For efficiency, the message is pre-allocated once and circulates between the EESP 104 and the kernel. The message contains just enough information to indicate the occurrence of the event. The EESP performs all hardware-specific functions related to the event, such as setting control registers, moving data 105 to a user's process 106, transmitting "Read" messages from the user process 106, etc., and then "releasing" the interrupt.

To become an EESP, a process issues a "connect" primitive specifying the appropriate device register(s). It must execute a "disconnect" before it exits. Device-independence is achieved by making the message protocol between EESP's and applications processes the same wherever possible. In this manner a wide variety of different types of hardware devices can be accommodated without having to make extensive software revisions.

Inter-Process Communication

All inter-process communication is via messages. Consequently, most of the virtual machine primitives are concerned with processing messages. The virtual machine kernel primitives are the following:

ALLOC - requests allocation of a (message) buffer of a given size.
FREE - requests deallocation of a given message buffer.
PUT - send a message to a given destination (by name or PID).
GET - wait for and dequeue the next incoming message, optionally from a specific process (by PID).
FORWARD - pass a received message through to another process.
CALL - send a message, then wait for and dequeue the reply.
REPLY - send a message to the originator of a given message.
ANY_MSG - returns "true" if the receive queue is not empty, else returns "false"; optionally, checks if any messages from a specific PID are queued.
CONNECT - indicates willingness to accept a particular class of external events.
DISCONNECT - indicates stop accepting external events.
RELEASE - used by EESP's only to indicate completion of processing of a particular external event message.

To further describe the function of the kernal primitives, ALLOC handles all memory allocations. It returns a pointer to a buffer which can be used for local storage within the process or which can be sent to another process (via PUT, etc.). ALLOC never "fails", but rather waits until enough memory is freed to satisfy the request.

The PUT primitive queues a message to another process. The sending process resumes execution as soon as the message is queued.

FORWARD is used to quickly reroute a message but maintain information about the original sender (whereas PUT always makes the sending process the originator of the message).

REPLY sends a message to the originator of a previously received message, rather than by name or PID.

CALL essentially implements remote subroutine invocations, causing the caller to suspend until the receiver executes a REPLY. Subsequently, the replied message is dequeued out of sequence, immediately upon arrival, and the caller resumes execution.

The emphasis is on concurrency, so that as many processes as possible are executed in parallel. Hence neither PUT nor FORWARD waits for the message to be delivered. Conversely, GET suspends a process until a message arrives and dequeues it in one operation. The ANY_MSG primitive is provided so that a process may determine whether there is anything of interest in the queue before commiting itself to a GET. The CONNECT, DISCONNECT, and RELEASE primitives are specifically used to handle external interrupts.

Figure 6:
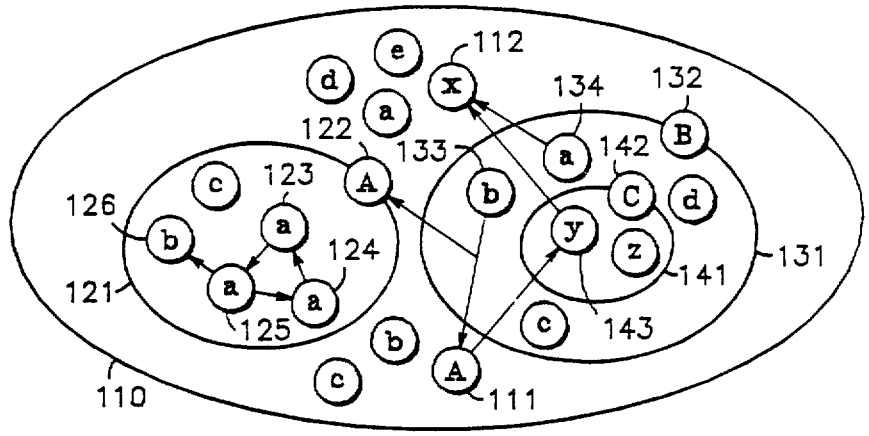
FIG. 6 shows how messages may be sent between processes within nested contexts.

When a message is sent by name, the destination process must be found in the name space. The search path is determined by the nesting of the contexts in which the sending process resides. From a given process, a message can be sent to all processes in its own context or (optionally) to those in any higher context. Refer to FIG. 6. The contexts are searched from the current one upward until a match is found or until the system context is reached. All processesd with the same name in that context are then queued a copy of the message.

For example, with reference to FIG. 6, assume that in context 141 process y sends a message to ALL processes by the name x. Process y first searches within its own context 141 but finds no process x. The process y searches within the next higher context 131 (its parent context) but again finds no process x. Then process y searches within the next higher context 110 and finds a process x, identified by reference numeral 112. Since it is the only process x in context 110, it is the only recipient of the message from process y.

If process a in context 131 sends a message to ALL processes by the name x, it first searches within its own context 131 and, finding no processes x there, it then searches within context 110 and finds process x.

Assume that process b in context 131 sends a message to ALL processes by the name A. It would find process A (111) in context 110, as well as process A (122) which is the context process for context 121.

A process may also send a message to itself or to its context process without knowing either name explicitly.

The concept of a "logical ring" (analogous to a LAN) allows a message to be sent to the NEXT process in the system with a given name. The message goes to exactly one process in the sender's context, if such a process exits. Otherwise the parent context is searched.

The virtual machine guarantess that each NEXT transmission will reach a different process and that eventually a transmission will be sent to the logically "first" process (the one that sent the original message) in the ring, completing the loop. In other words, all processes with the same name at the same level can communicate with each other without knowing how many there are or where they are located. The logical ring is essential for distributing services such as a data base. The ordering of processes in the ring is not predictable.

For example, regarding FIG. 6, if process a (125) in context 121 sends a message to process a using the NEXT primitive, the search finds a first process a (124) in the same context 121. Process a (124) is marked as having received the message, and then process a (124) sends the message on to the NEXT process a (123) in context 121. Process a (123) is marked as having received the message, and then it sends the message on to the NEXT process a, which is the original sender process a (125), which knows not to send it further on, since it's been marked as having already received the message.

Sending messages directly by PID obviates the need for a name search and ignores context boundaries. This is known as the DIRECT mode of transmission and is the most efficient. For example, process A (111) sends a message in the DIRECT mode to process y in context 141.

If a process sends a message in the LOCAL transmission mode, it sends it only to a process having the given name in the sender's own context.

In summary, including the DIRECT transmission mode, there are five transmission modes which can be used with the PUT, FORWARD, and CALL primitives:

ALL - to all processes with the given name in the first context which contains that name, starting with the sender's context and searching upwards through all parent contexts.

LOCAL - to all processes with the given name in the sender's context only.

NEXT - to the next process with the given name in the same context as the sender, if any; otherwise it searches upwards through all parent contexts until the name is found.

LEVEL - sends to "self" (the sending process) or to "context" (the context process corresponding to the sender's context); "self" cannot be used with CALL primitive.

DIRECT - sent by PID.

Messages are usually transmitted by queueing a pointer to the buffer containing the message. A message is only copied when there are multiple destinations or when the destination is on another cell.

Further description of the ALL and NEXT transmission modes is found below in the section entitled DETAILED DESCRIPTION OF INVENTION.

Operating System

The operating system of the present invention consists of a kernel, which implements the primitives described above, plus a set of processes which provide process creation and termination, time management (set time, set alarm, etc.) and which perform cell start-up and configuration. Drivers for devices are also implemented as processes (EESP'S), as described above. This allows both system services and device drivers to be added or replaced easily. The operating system also supports swapping and paging, although both are invisible to applications software.

Unlike known distributed computer systems, that of the present invention does not use a distinct "name server" process to resolve names. Name searching is confined to the kernel, which has the advantage of being much faster.

A minimal bootstrap program resides permanently (in ROM) on every cell, e.g. ROM 28 in cell N of FIG. 2. The bootstrap program executes automatically when a cell is powered up and begins by performing basic on-board diagnostics. It then attempts to find and start an initial system code module which comprises the entire kernel, and EESP's for the clock, disk (if required), and NIM (if required). The module is sought on the first disk drive on the cell, if any. If there isn't a disk, and the cell is on the LAN, a message will be sent out requesting the module. Failing that, the required software must be resident in ROM. System services for the clock and for process creation, an initialization program, and a minimal file system, are also built into the module. The initialization program sets up all of the kernel's internal tables and then calls predefined entry points in each of the preloaded services (file management, etc.). The net result is that EESP's for the attached devices are scheduled to run, and the cell is available.

In general, there exists a template file describing the initial software and hardware for each cell in the system. The template defines a set of initial processes (usually one per service) which are scheduled immediately after the cell start-up. These processes then start up their respective subsystems. A cell configuration service on each cell sends configuration messages to each subsystem when it is being initialized, informing it of the devices it owns. Thereafter, similar messages are sent whenever a new device is added to the cell or a device fails or is removed from the cell.

Thus there is no well-defined meaning for "system up" or "system down"- as long as any cell is active, the system as a whole may be considered to be "up". Cells can be shut down or started up dynamically without affecting other cells on the network. The same principle applies, in a limited sense, to peripherals. Devices which can identify themselves with regard to type, model number, etc. can be added or removed without operator intervention. The operating system cannot maintain a global status of the system, nor does it attempt to centralize control of the entire system.

Data Management

The present invention allows the user to store and retrieve data at several levels of abstraction. At various levels it provides device-independence, transparency, multiple views of the same data and support for transaction processing. Transparency means that a process need not know where a file is stored in order to access it. It also means that the file can be moved to another device without affecting the process. Only as many levels as are required for a particular application need be included in the system.

Figure 7:
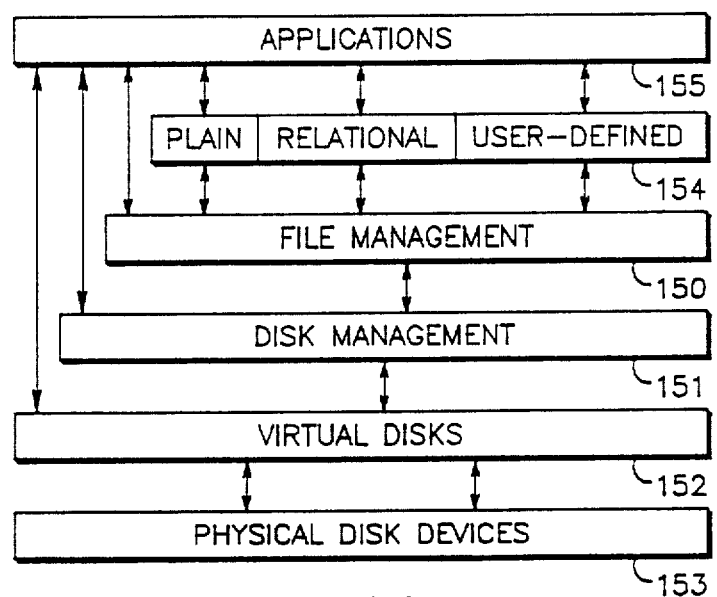
FIG. 7 shows an architectural model of the improved data management system incorporating the present invention.

Referring now to FIG. 7, the lowest level of data management is the physical disk layer 153, which is completely hidden from all applications software 155. Immediately above this level are virtual disks 152 which define an interface in terms of linear arrays of 1K blocks, regardless of the actual medium. Although the usual medium is disk, RAM may also be used (for temporary files) to improve performance. Three types of messages are supported at this level: "initial", to format the virtual disk, and "read" and "write" to access specific blocks.

The third level, disk management 151, organizes data within a virtual disk by means of indices. A disk index is a file at this level and is viewed as an extensible linear array of bytes. Messages are accepted to initialize the disk, allocate and delete indices, and read and write indices. The latter two functions operate starting at a given byte offset for a given byte length. An index is automatically extended when a request references a location outside the current limits. Physical storage is allocated only when data is actually written. Optional data caching is supported at the disk management level on a per cell basis.

File management 150 is layered on top of disk management 151 and introduces the concept of a "file system". A file system is a collection of named files (or named indices, in terms of the disk management layer 151). The name space constitutes a flat (single-level) directory which is allocated when the file system is initialized. A name may be up to 64 characters long and is hashed into the directory. Unnamed files are useful for building complex disk structures which are logically linked to each other, such as a hierarchical file directory or a database, or for temporary files which only the creator will use.

Transparency is supported only at the file management level 150 and above. It is used by simply omitting the file system name from the request (NEW, DELETE, RENAME, or OPEN). In this case, the request is forwarded through all file systems until the given file name is found.

The highest level 154 of data management deals in terms of "metaphors", which implement application-specific views of the data. A relational database is one example of a metaphor. Complex operations such as multi-user synchronization and record- or field-locking may be implemented at this level. The present invention supports two built-in views of the data: "plain" files, which are superficially equivalent to UNIX ™ files, and a relational database.

Figure 8:
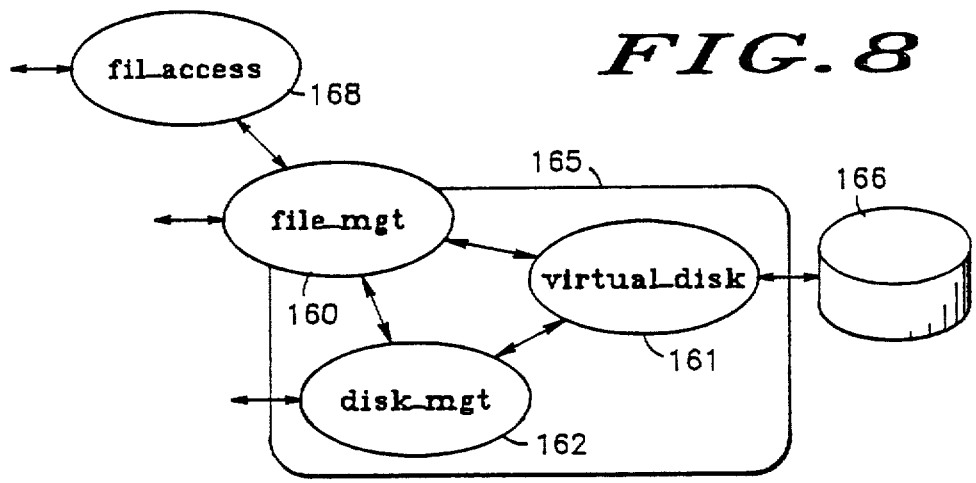
FIG. 8 shows an architectural software model of the improved data management system incorporating the present invention.

FIG. 8 illustrates the design of the data management software up to the plain-file level. Each active (mounted) file system 165 is represented by a file management context 160. The set of all such contexts forms a logical ring for purposes of message transmission; in other words, they all have the same name ("file_mgt"). The actual name of the file system (stored on the disk 166 at initialization) is known only to the context process.

In the plain-file metaphor, there is exactly one process for each open file, acting as a server for that file. That process (an instance of "fil_access") can be located in the appropriate file management context, or any application can create its own private copy of the process. The process allows standard file management functions (NEW, DELETE, RENAME, OPEN and CLOSE) plus SEEK, LOCK (lock the entire file against access by processes other than the owner) and UNLOCK. Note that a given file process is only opened once, by its owner. If not locked, any other processes which know its name or PID can read and write the file. Protection is provided through normal process name-scoping. Protection via passwords or a similar mechanism are in general unsupported unless supported by another metaphor.

Human Interface

The human interface (HI) of the present invention provides a set of tools with which an end user can construct a package specific to his applications requirements. Such a package is referred to as a "metaphor", since it reflects the user's particular view of the system. Multiple metaphors can be supported concurrently. One representative metaphor is, for example, a software development environment.

The purpose of the HI metaphor is to allow consistent, integrated access to the data and functions available in the system. Since users' perceptions of the system are based largely on the way they interact with it, it is important to provide an interface with which they feel comfortable. The HI allows a systems designer to create a model consisting of objects that are familiar to the end user and a set of actions that can be applied to them.

The fundamental concept of the HI is that of the "picture". All visually-oriented information, regardless of interpretation, is represented by pictures. A picture (such as a diagram, report, menu, icon, etc.) is defined in a device-independent format which is recognized and manipulated by all programs in the HI and all programs using the HI. It consists of "picture elements", such as "line", "arc", and "text", which can be stored compactly and transferred efficiently between processes. All elements have common attributes like color and fill pattern. Most also have type-specific attributes, such as typeface and style for text. Pictures are drawn in a large "world" co-ordinate system composed of "virtual pixels".

Because all data is in the form of pictures, segments of data can be freely copied between applications, e.g., from a live display to a word processor. No intermediate format or conversion is required. One consequence of this is that the end user or original equipment manufacturer (OEM) has complete flexibility in defining the formats of windows, menus, icons, error messages, help pages, etc. All such pictures are stored in a library rather than being built into the software and so are changeable at any time without reprogramming. A comprehensive editor is available to define and modify pictures on-line.

All interaction with the user's environment is through either "virtual input" or "virtual output" devices. A virtual input device accepts keybroads, mice, light pens, analog dials, pushbuttons, etc. and translates them into text, cursor-positioning, action, dial, switch, and number messages. All physical input devices must map into this set of standard messages. Only one process, an input manager for the specific device, is responsible for performing the translation. Other processes can then deal with the input without being dependent on its source.

Similarly, a virtual output manager translates standard output messages to the physical representation appropriate to a specific device (screen, printer, plotter, etc.). A picture drawn on any terminal or by a process can be displayed or printed on any device, subject to the physical limitations of that device.

Figure 9:
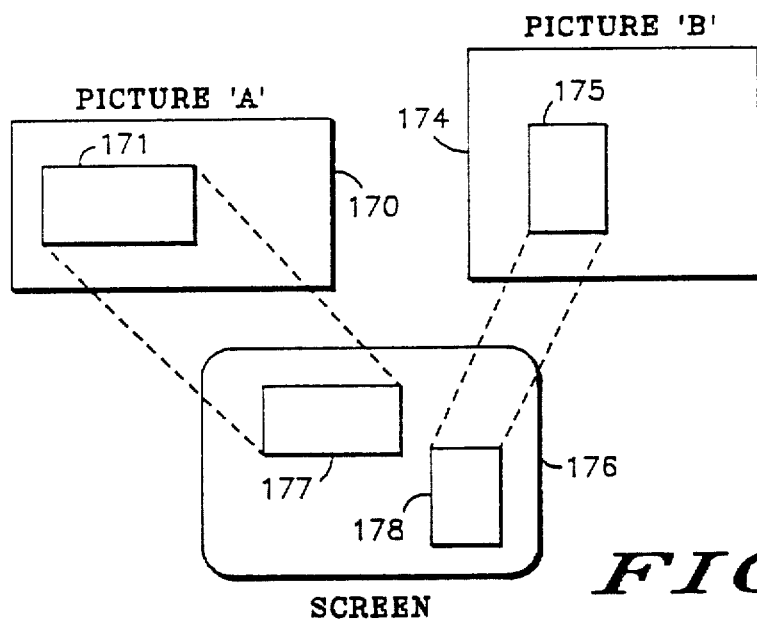
FIG. 9 shows the relationship between pictures, views, and windows in the human interface of a data processing system incorporating the present invention.

With reference to FIG. 9, two "pictures" are illustrated—picture A (170) and picture B (174).

The concept of a "view" is used to map a particular rectangular area of a picture to a particular device. In FIG. 9, picture A is illustrated as containing at least one view 171, and picture B contains at least one view 175. Views can be used, for example, to partition a screen for multiple applications or to extract page-sized subsets of a picture for printing.

If the view appears on a screen it is contained in a "window". With reference again to FIG. 9, view 171 of picture A is mapped to screen 176 as window 177, and view 175 of picture B is mapped as window 178.

The HI allows the user to dynamically change the size of the window, move the window around on the screen, and move the picture under the window to view different parts of it (i.e., scroll in any direction). If a picture which is mapped to one or more windows changes, all affected views of that picture on all screens are automatically updated. There is no logical limit to the number or sizes of windows on a particular screen. Since the system is distributed, it's natural for pictures and windows to be on different cells. For example, several alarm displays can share a single, common picture.

The primary mechanism for interacting with the HI is to move the cursor to the desired object and "select" it by pressing a key or button. An action may be performed automatically upon selection or by further interaction, often using menus. For example, selecting an icon usually activates the corresponding application immediately. Selecting a piece of text is often followed by selection of a command such as "cut" or "underline". Actions can be dynamically mapped to function keys on a keyboard so that pressing a key is equivalent to selecting an icon or a menu item. A given set of cursors (the cursor changes as it moves from one application picture to another), windows, menus, icons, and function keys define a "metaphor".

The HI builds on the above concepts to provide a set of distributed services. These include electronic mail, which allows two or more users at different terminals to communicate with each other in real time or to queue files for later delivery, and a forms manager for data entry. A subclass of windows called "virtual terminals" provides emulation of standard commercially available terminals.

Figure 10:
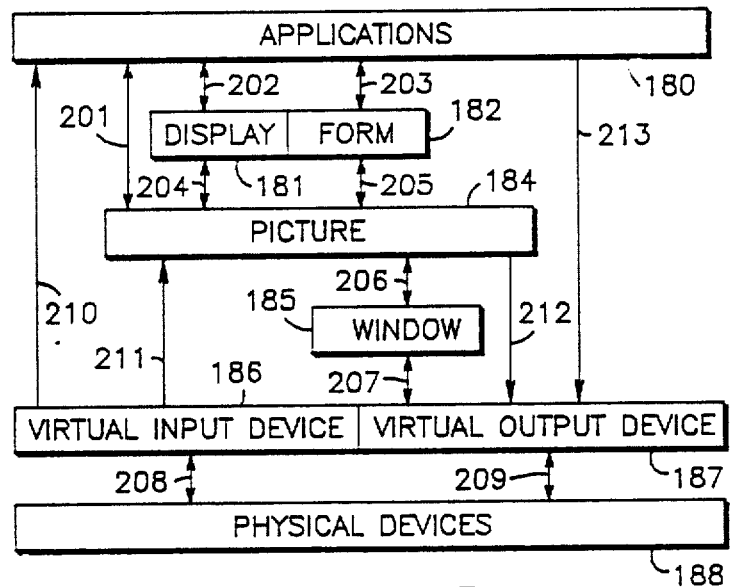
FIG. 10 shows a conceptual view of the different levels of human interface within a data processing system incorporating the present invention.

FIG. 10 shows the different levels of the HI and data flow through them. Arrows 201-209 indicate the most common paths, while arrows 210-213 indicate additional paths. The interface can be configured to leave out unneeded layers for customized applications. The philosphy behind the HI design dictates one process per object. That is, a process is created for each active window, picture, input or output device, etc. As a result, the processes are simplified and can be distributed across cells almost arbitrarily.

Error Management

An error management service is provided to catch errors and report them to the appropriate process(es). It serves as a foundation upon which more sophisticated diagnostics and/or recovery schemes may be constructed. The system can intercept processor internal exceptions (bus and address errors, "trap" instructions, etc.), external exceptions (such as spurious interrupts), device faults, and software-defined errors. The latter category is open-ended and comprises unexpected termination of a process, the result of a diagnostic program, or in general any error detected by the kernel or by any process. Failure to find the destination of a transmitted message is one example. While internal exceptions can be associated with the particular process which caused the error, external exceptions are independent, although they may directly impact one or more processes.

In summary, the prime functions of the error management service are to: (1) classify and log errors, (2) generate notification messages, (3) accept requests to configure the service and specify options, (4) accept software error messages from other subsystems, and (5) terminate affected processes, if required. Item (3) above allows applications and services to indicate that they want to know about specific errors or classes of errors. Options include automatic logging, automatic display on the operator's terminal, automatic suspension (for debugging) or abortion of the offending process, and automatic dumping of the process image to a file. The default actions, if no options have been specified, are termination, logging and display. Any outstanding request can be cancelled at any time.

The HI logging service provides the facility to store error messages in a chronological file, maintain a hardcopy log, and create a dynamic display of errors, ordered by time, priority, class, etc. The debugger is often invoked upon occurrence of a process error to examine the process' state for clues.

DETAILED DESCRIPTION OF THE INVENTION

FIG. 11 shows a conceptual view of the local area network (LAN), including several cells, and a representational view of a network interface module (NIM). The LAN 404 couples representative cells 1, 2, and N (400-404). Cell 2 (401) illustrates further aspects of the invention. A network interface module (NIM) 406 is illustrated in block diagram form as comprising, among other things, a resident process name cache 440 and a non-resident process name cache 441. The NIM 406 also includes a copy of the kernel, shown generally as 408, and at least one memory store 410, which contains at least one process. In FIG. 11, memory store 410 is shown as containing representative processes B, F, and C. Every other cell coupled to LAN 404 also comprises a NIM like NIM 406 of cell 2 (401).

FIG. 12A shows a representation of the NIM's non-resident process name cache 441. The cache is a high speed memory comprising a plurality of addressable memory locations. Each location has at least three fields, as shown by a representative cache word 414, including field 433 containing the process name, field 434 containing the address of the next cell in the LAN where this process is located, and field 435 containing the "discovery in process" (DIP) flag. The operation of the NIM's non-resident process name cache will be discussed further below.

FIG. 12B shows a representation of the NIM's resident process name cache 440. Each cache word comprises at least three fields: field 436 containing the process name, field 437 containing the process count, and the "transmitted" (T) flag. The operation will be discussed further below.

FIG. 13A shows the format of the discovery message 420. The discovery message 420 includes at least a portion 421 containing the process name, and a portion 422 containing the address of the cell originating the message.

FIG. 13B shows the format of the discovery response message 424. The discovery response message 424 includes at least a portion 425 containing the process name, and a portion 426 containing the address of the responding cell.

FIG. 13C shows the format of the update cache message 428. The update cache message 428 includes at least a portion 429 containing the process name, and a portion 430 containing the address of the cell creating the process.

OPERATION OF PREFERRED EMBODIMENT

NEXT and ALL Message Transmission Modes

As described above, processes may be addressed (wherever they reside in the system) symbolically by process name. Process names are not required to be unique within the system. Two special message transmission, or addressing, modes are provided to transmit messages between any given process and any named process: NEXT-mode and ALL-mode.

In NEXT-mode addressing, the destination process is specified by name and is searched first within the sender's context level (i.e. among all brother processes, regardless if the sender is a context or not). If none is found, the search continues in the parent context, then in the parent's parent context, etc. The first process with the specified name in the first context level where at least one match is found will receive the message.

A special case of the NEXT-mode addressing is where the destination process' name is the same as the sender process' name, in which case: (1) if the sender is the only process with the specified name in its context, it will also be the receiver of the message, and (2) if there are several processes with the specified name in the same context, each will receive the message.

The kernel may implement a logical chain of same-named processes within a cell. The NIM provides the link that forms the chain into a logical ring, connecting different cells. If all processes in the chain in one cell have received the message, the message is passed to the NIM for transmission across the LAN to the next process with the same name, wherever it may reside.

The NEXT-mode message format includes a field designated as the "accepted" flag. Transmission of a NEXT-mode message is considered successful if it returns to the originating cell with its "accepted" flag set to true. Acceptance means that at least one process with the given name has received the message (NEXT-mode messages to be transmitted are always passed to the NIM unaccepted). In this case, the message is simply freed. If the message could not be sent or returns without being accepted, the transmission is considered to have failed. Failure of the message to return will result in its retransmission. If the message was sent in the logical ring mode (i.e., forwarded by a process to another process with the same name), the message is returned to this process to complete the ring. Otherwise, it is passed to the kernel with transmission error indicated.

In ALL-mode addressing, the destination process is also specified by name. It is searched for in the sender's context first (i.e., among the sender's children if the sender is a context, and among its brothers otherwise). If none is found, the search continues in the parent context, then in the parent's parent context, etc. All processes with the specified name in the first context level where at least one match is found will receive the message (except the sender if it happens to have the same name).

All ALL-mode messages are passed to the NIM for transmission to all, if any, processes residing in other cells on the LAN.

The ALL-mode message format also includes a field designated as the "accepted" flag (an ALL-mode message will be accepted only if one or more processes with the addressed name reside on the originating cell). Transmission of an ALL-mode message is considered successful if it returns to the originating cell with its "accepted" flag set true. In this case, the message is freed. If the message could not be sent, or returns without being accepted, or fails to return at all, the transmission is considered to have failed, and it is passed to the kernel with a transmission error indicated.

Non-Resident Process Discovery and Caching

When the NIM receives a message from the kernel to be transmitted to a named process residing on another cell, it must determine which cell to send it to. Each NIM thus maintains a cache of non-resident process names (cache 441, FIG. 12A). This cache is a dynamic table consisting of a number of records each of which comprises three field: the process name 433, the address 434 of the next cell in which the process resides, and a "discovery-in-progress" (DIP) flag 435.

It is important to note that each NIM knows the address of only the "next" cell containing the named process (the "next" cell may not be the closest cell physically to the NIM). This requires that the cells comprising the system be viewed as forming a logical ring. All messages that are propagated cell-to-cell such as "discovery" messages (discussed below) are passed in one direction around this logical ring.

Another important point is that the non-resident process name cache 441 of any given cell contains only the names of the processes to which that cell wishes to transmit messages. The contents of the cache are dynamic, in that process names may be added or deleted.

When the NIM receives a message to be transmitted to a named process, it searches its non-resident process name cache 441 for the process name. If it's not found, as will be the case initially on power-up (since the cache is empty), it is necessary to locate or "discover" the process' residency.

The process name is registered in a queue in the LAN, and the DIP flag 435 is set true. The message is placed into a holding queue awaiting completion of the discovery. All other messages addressed to the same process while discovery of the process is in progress are also placed into the holding queue.

The LAN then builds a discovery message (420, FIG. 13A). The essential elements of the discovery message are the name of the process being discovered and the address of the message originator. The discovery message is sent to the first cell in the logical ring.

(However, if a logical ring has not yet been established, then the message transmission is terminated, since it is unknown when, if ever, a ring will be formed. Unaccepted messages are returned to the kernel with a transmission error status. Accepted messages are freed. Since the whereabouts of the process has not been determined, the address recorded in the non-resident process name cache table 441 is set to the cell's own address.)

After the discovery message has been successfully sent to the next cell, the message is placed in a timeout queue awaiting either the return of the discovery message or the receipt of a discovery response message (424, FIG. 13B). If a timeout occurs, this indicates that a cell failed before propagating the discovery message, and the discovery message must be retransmitted. If the discovery message returns to the originating cell, then the process does not currently exist in any other cell on the LAN. The discovery message is dequeued from the timeout queue on receipt of either the returning discovery message or the corresponding discovery response message.

When a NIM receives a discovery message off the LAN, it searches its resident process name cache for the name in the message. If it finds it, the discovery message is then transformed into a discovery response message, which identifies the responding cell and is sent to the message originator. If, however, the process doesn't exist in this cell, the discovery message is sent to the next cell in the logical ring. The message is propagated in this way until either it is received by a cell with the named process or it returns to the originating cell.

If the discovery message returns to the originating cell indicating the named process doesn't exist externally, an invalid cell address indicating the process doesn't exist externally is placed in the process' record in the non-resident process name cache table. Since discovery has been completed, the DIP flag is set to false. All messages addressed to the named process are dequeued from the holding queue. Messages that were originated by another cell are returned to that cell. Messages which were originated by this cell are either returned to the kernel with a transmission error indicated or are simply freed.

If a discovery response message is received by a NIM, the address of the responding cell is recorded in the non-resident process name cache table, and the DIP flag is set to false, since the discovery has been completed. All messages addressed to the discovered process are dequeued from the holding queue and sent to the cell that responded. These messages are placed in a timeout queue upon successful transmission to the cell to await their return.

When a NIM receives an ALL-mode or NEXT-mode message addressed to it off the LAN, it searches its resident process name cache (440, FIG. 12B) for the name of the addressed process. If it's not found, the message is returned to the sender. This happens, for example, if the process has been deleted. On receipt of the rejected message, the sending NIM must rediscover the address of the next cell containing the process and update its non-resident process name cache.

If the name is found in the resident process name cache, the message is passed to the addressed process through the kernel. If the message has not already been accepted, the NIM must wait for the kernel to indicate whether the message was accepted. This is required since there exists a time window between the checking of the resident process name cache and the kernel being handed the message during which the process may be deleted.

NEXT-mode messages are always passed to the NIM with the "accepted" flag set false. So the NIM at the receiving end must always wait for the kernel to indicate its acceptance. On receipt of this response from the kernel, the message is returned to the originator. If the message was accepted, the originator will dequeue it from the timeout queue and consider the transmission successful. If, however, the message was not accepted due to the process having been deleted, the originating NIM will attempt to rediscover the process' location.

An ALL-mode message may be immediately propagated to the next cell containing the named process only if the message has already been accepted. If the message has not been accepted, its propagation must be delayed until the kernel has indicated whether it was accepted.

Both NEXT-mode and ALL-mode messages eventually return to the originating cell. If a cell fails before propagating the message, the originating cell will time out. NEXT-mode messages will be transmitted. An ALL-mode message, however, cannot be retransmitted, since it is not known which cells received the message and which did not. Depending upon whether the message was accepted, it is either freed or returned to the kernel with a transmission error status.

Process Creation and Deletion

Whenever a process is created or deleted, the kernel informs the NIM. The NIM maintains its own resident process name cache, which is a dynamic table consisting of one record per resident process name. Each record has three fields: the name of the process, a process count, and a "transmitted" flag (refer to FIG. 12B).

Whenever a process is created, the cache is searched for the name. If it's not found, a record is entered for the process with the count set to one and the transmitted flag set to false. If the name is already in the resident process name cache, the process count is simply incremented.

When a process is deleted, the count in the record corresponding to the process is decremented. When it reaches a value of zero, the named process no longer exists in the cell, and the record is removed from the resident process name cache.

Whenever a new process is created, an update cache message (refer to FIG. 13C) is built and transmitted to the next cell in the logical ring. The transmitted flag is set to true. Once transmitted, the message is placed in a timeout queue awaiting its return.

The update cache message contains the name of the created process and the address of the cell in which it was created. On receipt of such an update cache message, a NIM searches its non-resident process name cache for the process. If found, the non-resident process name cache is updated if the cell containing the new process is closer than the current cell listed which contains this process.

The update cache message is passed from cell to cell around the logical ring until it arrives at the originating cell. Failure of the cell to propagate the message will cause the originating cell to time out and retransmit the message.

No special action is taken on process deletion. A NIM will discover that a process has been deleted from a cell when an ALL-mode or NEXT-mode message sent to that cell is rejected and returned. The sending cell will then attempt to rediscover the process and update its non-resident process name cache.

DESCRIPTION OF PROGRAM LISTINGS

Program Listings A-E contain a "C" language implementation of the concepts relating to message transmission among processes in a data processing system incorporating the present invention. The implementation, in particular, of the innovative features of the present invention as set forth and described above will now be described.

Program Listing A

Program Listing A maintains the non-resident process name cache. All NEXT and ALL mode messages are passed through this process.

Lines 158-186: This code is executed if the message was originated by another cell. The first section handles messages being returned by the kernel and restores the message identifier. The second section saves the message as received off the LAN if not accepted so that the identifier can be restored. The last section returns NEXT mode messages to their origin.

Lines 188-192: This code handles the case where the named process is not found in the non-resident process name cache. A record is acquired, initialized, and placed into the cache. The message is then placed in the holding queue and a discovery message built and transmitted in Program Listing B.

Lines 194-208: This code handles the case where the named process already exists in the cache. If discovery is already in progress, the message is just placed in the holding queue. If discovery is still required, (celladdr=self), then the message is placed in the holding queue, and a discovery message is issued. If the address in the cache is zero, the process does not exist externally. Otherwise the message is sent to the cell.

Lines 215-217: This code handles the unsuccessful transmission of an ALL or NEXT mode message. Rediscovery will be attempted if possible.

Lines 219-230: This code handles the unsuccessful transmission of a discovery message. If originated by this cell, it will be retransmitted if possible, or the messages in the holding queue will be dequeued. If it was originated by another cell, it will either be discarded or retransmitted.

Lines 232-239: This code handles the unsuccessful transmission of an update cache message originated by another cell. It will be retransmitted if possible or discarded.

Lines 248-274: This code handles received discovery and discovery response messages. The appropriate non-resident process name cache record is updated. The messages in the holding queue are then dequeued. If the addressed process exists externally, the messages are sent to the cell. Otherwise the messages are returned to the originating cell or returned to the kernel.

Lines 277-286: This code deals with the receipt of update cache messages. The cache is searched for the name and updated if required. The message is then sent to the next cell.

Lines 289-291: This code handles the receipt of a reject ALL or NEXT mode message. The named process is rediscovered to allow retransmission of the message.

Lines 300-313: This code is entered when an ALL or NEXT mode message originated by this cell fails to return, and a time-out occurs. If possible, a NEXT mode message will be resent. If not, or if an ALL mode message timed out, the message is returned to the kernel.

Line 316: This code retransmits a discovery message originated by this cell which failed to return in time. If not possible, the messages in the holding queue are dequeued.

Program Listing B

Program Listing B is called by Program Listing A when discovery is required.

Lines 64-79: This code is executed if another cell exists on the LAN. The ALL or NEXT mode message is placed in the holding queue, and a discovery message is built and sent to the next known cell.

Lines 82-89: This code is executed if no other cells are up. The cache record is updated to indicate that discovery is still required. If the message was originated by this cell, it is returned to the kernel. Otherwise, it is discarded.

Program Listing C

Program Listing C is called by Program Listing A on various error conditions.

Lines 67-68: If another cell exists, the discovery message is transmitted to the next cell.

Lines 70-84: If there are no other cells, the cache record is updated to indicate that discovery is still required. All messages addressed to the affected process are dequeued from the holding queue and returned to the kernel.

Program Listing D

Program Listing D is called whenever any message is received off the LAN.

Lines 84-90: If the addressed process name is not found in the resident process name cache, the message is rejected and returned to the sender.

Lines 93-104: If the addressed process exists in this cell, a copy of the message is made and passed to Program Listing A. The original message is passed to the destination process through the kernel.

Program Listing E

Program Listing E is informed by the kernel of all process creations and deletions.

Lines 130-162: This code is executed periodically while "signalon" is true. If another cell exists on the LAN, it scans through the resident process name cache and transmits update cache messages for any process names that have not yet been sent.

Lines 201-241: This code is executed whenever a process is created. If the process is a new one, a resident process name cache record is obtained and initialized. If another cell exists on the LAN, an update cache message for the new process is sent to the next cell. Finally, the process count is incremented.

Lines 244-263: These lines handle update cache message time-outs. If the affected process name still exists and there is a cell to send to, then the update cache message is retransmitted. If there are no other cells, then the record is marked as not being sent.

Lines 267-273: This code is executed whenever a process is deleted. It simply decrements the process count and, if it reaches zero, frees the record.

It will be apparent to those skilled in the art that the herein disclosed invention may be modified in numerous ways and may assume many embodiments other than the preferred form specifically set out and described above. Accordingly, it is intended by the appended claims to cover all modifications of the invention which fall within the true spirit and scope of the invention.

PROGRAM LISTING A

```
10      MODULE NAME   :  %M%
11
12      SUBSYSTEM NAME :   NIM
13
14      DATE & TIME OF CREATION   :      %E%     %U%
15
16      DATE & TIME OF COMPILATION :  %D%    %T%
17
18      VERSION  :      %R%.%L%
19
20      PROGRAMMER  :   Bernie Weisshaar
21
22      DESCRIPTION :
23            Context name discovery process.
24
25
26      PARAMETERS PASSED  :  None
27
28
29      PARAMETERS RETURNED  :  None
```

```
30
31
32  */
33  static char SrcId[] = "%Z% %M%:%I%";
34
35
36
37  #include <local/cx.h>
38  #include "kerntypes.h"
39  #include "nimkern.h"
40  #include "nimgen.h"
41  #include <local/nim/nimif.h>
42
43  #define self hwv_celladdr
44  #define RECPERSEG 10
45
46
47  int trg_ifdisp_eg;
48  int trg_ifdisp_lg;
49
50
51
52  #ifdef CXE
53  int ifv_offset;              /* record offset to name field */
54  long nwov_pid;               /* pid of nwop */
55  long hwchamgr_pid;           /* pid of hwchamgr */
56  long hwchbmgr_pid;           /* pid of hwchbmgr */
57  long hwchcmgr_pid;           /* pid of hwchcmgr */
58  int hwv_celladdr;            /* this cell's physical address */
59  #else
60  extern int ifv_offset;       /* record offset to name field */
61  extern long nwov_pid;        /* pid of nwop */
62  extern long hwchamgr_pid;    /* pid of hwchamgr */
63  extern long hwchbmgr_pid;    /* pid of hwchbmgr */
64  extern long hwchcmgr_pid;    /* pid of hwchcmgr */
65  extern int hwv_celladdr;     /* this cell's physical address */
66  #endif
67
68
69
70  IFDISSD_NAMQUE *ifdisv_nqhead;   /* context name queue head pointer */
71  IFDISSD_NAMQUE *ifdisv_nqtail;   /* context name queue tail pointer */
72  IPCSD_TXRXMSG *ifdisv_hldhead;   /* holding queue head pointer */
73  IPCSD_TXRXMSG *ifdisv_hldtail;   /* holding queue tail pointer */
74
75
76
77  PROCESS(ifdisp)
78  {
79      extern IFDISSD_NAMQUE *genr_nam();
80      extern IFDISSD_NAMQUE *genr_gar();
81      extern void genr_alk();
82      extern void genr_copy();
83      extern void genr_prnt();
84      extern void genr_lk();
85      extern void genr_ulk();
86      extern void genr_free();
87      extern bool nwor_beynd();
88      extern void ifdisr_txd();
89      extern void ifdisr_fail();
90      extern void ifcpmr_txs();
91      extern unsigned int ifor_nc();
92
93      IFDISSD_NAMQUE *ifdisv_avhead;       /* available queue head pointer */
94      IFDISSD_NAMQUE *ifdisv_avtail;       /* available queue tail pointer */
95      IPCSD_TXRXMSG *ifdisv_idhead;        /* msg id queue head pointer */
96      IPCSD_TXRXMSG *ifdisv_idtail;        /* msg id queue tail pointer */
97      IPCSD_TXRXMSG *ifdisv_midhead;       /* msg id holding queue head pointer */
98      IPCSD_TXRXMSG *ifdisv_midtail;       /* msg id holding queue tail pointer */
99      register IPCSD_TXRXMSG *msgptr;      /* pointer to txrxmsg IPC message */
100     register IPCSD_TXRXMSG *msgptr2;     /* pointer to txrxmsg IPC message */
101     register IPCSD_TXRXMSG *msgptr3;     /* pointer to txrxmsg IPC message */
102     register IFDISSD_NAMQUE *recptr;     /* pointer into context name queue */
103     int *ipcmsg;                         /* pointer to received IPC message */
104     char *namptr;                        /* pointer to context name string */
105     int i;                               /* loop counter */
106     unsigned int destin;                 /* destination cell address */
107
108     ifdisv_hldhead = ifdisv_hldtail = 0;
109     ifdisv_avhead = ifdisv_avtail = ifdisv_nqhead = ifdisv_nqtail = 0;
110     ifdisv_idhead = ifdisv_idtail = ifdisv_midhead = ifdisv_midtail = 0;
111 #ifdef OLDKERN
112     while ((*(ipcmsg = Get(NULL, NULL)) != (int)INIT)
113 #else
114     while ((*(ipcmsg = (int*)Get(NULL, NULL, NULL)) != (int)INIT)
```

```
115     #endif
116             Free(ipcmsg);
117     #ifdef CXE
118             ifv_offset = ((IPCSD_INIT*)(ipcmsg))->ifv_offset;
119             nwov_pid = ((IPCSD_INIT*)(ipcmsg))->nwop_pid;
120             hwchamgr_pid = ((IPCSD_INIT*)(ipcmsg))->hwchamgr_pid;
121             hwchbmgr_pid = ((IPCSD_INIT*)(ipcmsg))->hwchbmgr_pid;
122             hwchcmgr_pid = ((IPCSD_INIT*)(ipcmsg))->hwchcmgr_pid;
123             hwv_celladdr = ((IPCSD_INIT*)(ipcmsg))->hwv_celladdr;
124     #endif
125             Free(ipcmsg);
126             genr_prnt("ifdisp: initialized\n");
127
128             FOREVER {
129                 trg_ifdisp_eg = -1;
130     #ifdef OLDKERN
131                 ipcmsg = Get(NULL, NULL);
132     #else
133                 ipcmsg = (int*)Get(NULL, NULL, NULL);
134     #endif
135                 trg_ifdisp_lg = *ipcmsg;
136                 switch (*ipcmsg) {
137
138                 case DBPRINT:                   /* start of code for DBPRINT */
139                     printf("\nifdisv_nqhead=%x, ifdisv_nqtail=%x\n", ifdisv_nqhead, ifdisv_nqtail);
140                     if (ifdisv_nqhead != 0) {
141                         printf("discinprog  cell   context_name\n");
142                         for (recptr = ifdisv_nqhead; recptr != 0; recptr = (IFDISSD_NAMQUE*)(recptr->links.next))
143                             printf("   %1d      %2d   %s\n", recptr->discinprog, recptr->celladdr,
                                    recptr->name);
144                     }
145                     printf("ifdisv_hldhead=%x, ifdisv_hldtail=%x\n", ifdisv_hldhead, ifdisv_hldtail);
146                     if (ifdisv_hldhead != 0) {
147                         printf("txmode   context_name\n");
148                         for (msgptr = ifdisv_hldhead; msgptr != 0; msgptr = (IPCSD_TXRXMSG*)(msgptr->links.next))
149                             printf("  %1d    %s\n", ((MSG*)(msgptr->msgaddr))->mode, msgptr->
                                    dest_spec.p_name);
150                     }
151                     printf("ifdisv_idhead=%x, ifdisv_idtail=%x\n", ifdisv_idhead, ifdisv_idtail);
152                     printf("ifdisv_midhead=%x, ifdisv_midtail=%x\n", ifdisv_midhead, ifdisv_midtail);
153                     Free(ipcmsg);
154                     break;                      /* end of code for DBPRINT */
155
156                 case TXMSG:
157                     msgptr = (IPCSD_TXRXMSG*)ipcmsg;
158                     if (msgptr->msgorg != self) {
159                         if (msgptr->msgid == 0)
160                             if ((msgptr2 = ifdisv_idhead) == 0) {
161                                 genr_lk(&ifdisv_midhead, &ifdisv_midtail, msgptr);
162                                 msgptr = 0;
163                             } else {
164                                 msgptr->msgid = msgptr2->msgid;
165                                 msgptr->msgorg = msgptr2->msgorg;
166                                 genr_ulk(&ifdisv_idhead, &ifdisv_idtail, msgptr2);
167                                 genr_free(msgptr2);
168                             }
169                         else
170                             if (!(((MSG*)(msgptr->msgaddr))->flags & ACCEPTED))
171                                 if ((msgptr2 = ifdisv_midhead) == 0) {
172                                     genr_lk(&ifdisv_idhead, &ifdisv_idtail, msgptr);
173                                     msgptr = 0;
174                                 } else {
175                                     msgptr2->msgid = msgptr->msgid;
176                                     msgptr2->msgorg = msgptr->msgorg;
177                                     genr_ulk(&ifdisv_midhead, &ifdisv_midtail, msgptr2);
178                                     genr_free(msgptr);
179                                     msgptr = msgptr2;
180                                 }
181                         if ((((MSG*)(msgptr->msgaddr))->mode == (unsigned char)NEXT) && (((MSG*)(msgptr->msgaddr))->flags & ACCEPTED)) {
182                             msgptr->msgsrcdst = msgptr->msgorg;
183                             Forward(DIRECT, nwov_pid, msgptr);
184                             msgptr = 0;
185                         }
186                     }
187                     if (msgptr != 0)
188                         if ((recptr = genr_nam(&ifdisv_nqhead, msgptr->dest_spec.p_name, ifv_offset)) == 0) {
189                             recptr = genr_gar(&ifdisv_avhead, &ifdisv_avtail, sizeof(IFDISSD_NAMQUE),
                                    RECPERSEG);
190                             strncpy(recptr->name, msgptr->dest_spec.p_name, MAXNAM);
191                             genr_alk(&ifdisv_nqhead, &ifdisv_nqtail, recptr, ifv_offset);
192                             ifdisr_txd(msgptr, recptr);
193                         } else
```

```
194                if (recptr->discinprog)
195                    genr_lk(&ifdisv_hldhead, &ifdisv_hldtail, msgptr);
196                else
197                    if (recptr->celladdr != 0)
198                        if (recptr->celladdr == self)
199                            ifdisr_txd(msgptr, recptr);
200                        else {
201                            msgptr->msgsrcdst = recptr->celladdr;
202                            Forward(DIRECT, nwov_pid, msgptr);
203                        }
204                    else {
205                        msgptr->ipcmsgtype = (int)TXSTAT;
206                        msgptr->txrx.txstat.status = FAILURE;
207                        ifcpmr_txs(msgptr);
208                    }
209            break;
210
211        case TXSTAT:
212            msgptr = (IPCSD_TXRXMSG*)ipcmsg;
213            switch (msgptr->msgtype) {
214            case MSG_TYP_CPMMSG:
215                recptr = genr_nam(&ifdisv_nqhead, msgptr->dest_spec.p_name, ifv_offset);
216                ifdisr_txd(msgptr, recptr);
217                break;
218            case MSG_TYP_DIS:
219                if (msgptr->msgorg == self)
220                    ifdisr_fail(msgptr);
221                else {
222                    msgptr->msgsrcdst = ifor_nc();
223                    if ((nwor_beynd(msgptr->msgsrcdst, msgptr->msgorg)) || (msgptr->msgsrcdst == self))
224                        genr_free(msgptr);
225                    else {
226                        msgptr->ipcmsgtype = (int)TXMSG;
227                        Forward(DIRECT, nwov_pid, msgptr);
228                    }
229                }
230                break;
231            case MSG_TYP_UPD:
232                msgptr->msgsrcdst = ifor_nc();
233                if ((nwor_beynd(msgptr->msgsrcdst, msgptr->msgorg)) || (msgptr->msgsrcdst == self))
234                    genr_free(msgptr);
235                else {
236                    msgptr->ipcmsgtype = (int)TXMSG;
237                    Forward(DIRECT, nwov_pid, msgptr);
238                }
239                break;
240            }
241            break;
242
243        case RXMSG:
244            msgptr = (IPCSD_TXRXMSG*)ipcmsg;
245            switch (msgptr->msgtype) {
246            case MSG_TYP_DISRSP:
247            case MSG_TYP_DIS:
248                namptr = (char*)(msgptr + 1);
249                recptr = genr_nam(&ifdisv_nqhead, namptr, ifv_offset);
250                recptr->celladdr = (msgptr->msgtype == MSG_TYP_DISRSP) ? msgptr->msgsrcdst : 0;
251                recptr->discinprog = FALSE;
252                msgptr2 = ifdisv_hldhead;
253                while (msgptr2 != 0)
254                    if (strncmp(namptr, msgptr2->dest_spec.p_name, MAXNAM) == 0) {
255                        msgptr3 = (IPCSD_TXRXMSG*)(msgptr2->links.next);
256                        genr_ulk(&ifdisv_hldhead, &ifdisv_hldtail, msgptr2);
257                        if (recptr->celladdr != 0) {
258                            msgptr2->msgsrcdst = recptr->celladdr;
259                            msgptr2->ipcmsgtype = (int)TXMSG;
260                            Forward(DIRECT, nwov_pid, msgptr2);
261                        } else
262                            if (msgptr2->msgorg != self) {
263                                msgptr2->msgsrcdst = msgptr2->msgorg;
264                                msgptr2->ipcmsgtype = (int)TXMSG;
265                                Forward(DIRECT, nwov_pid, msgptr2);
266                            } else {
267                                msgptr2->ipcmsgtype = (int)TXSTAT;
268                                msgptr2->txrx.txstat.status = FAILURE;
269                                ifcpmr_txs(msgptr2);
270                            }
271                        msgptr2 = msgptr3;
272                    } else
273                        msgptr2 = (IPCSD_TXRXMSG*)(msgptr2->links.next);
274                genr_free(msgptr);
275                break;
276            case MSG_TYP_UPD:
277                if ((recptr = genr_nam(&ifdisv_nqhead, msgptr+1, ifv_offset)) != 0)
278                    if (!recptr->discinprog)
```

```
                    if (!nwor_beynd(msgptr->msgorg, recptr->celladdr))
                        recptr->celladdr = msgptr->msgorg;
                msgptr->ipcmsgtype = (int)TXMSG;
                if ((msgptr->msgsrcdst = ifor_nc()) != self) {
                    msgptr->ipcmsgtype = (int)TXMSG;
                    Forward(DIRECT, nwov_pid, msgptr);
                } else
                    genr_free(msgptr);
                break;
            case MSG_TYP_CPMREJ:
                msgptr->msgtype = MSG_TYP_CPMMSG;
                recptr = genr_nam(&ifdisv_nqhead, msgptr->dest_spec.p_name, ifv_offset);
                ifdisr_txd(msgptr, recptr);
                break;
            }
            break;

case IFTO:
            msgptr = (IPCSD_TXRXMSG*)ipcmsg;
            switch (msgptr->msgtype) {
            case MSG_TYP_CPMMSG:
                if (((MSG*)(msgptr->msgaddr))->mode == (char)NEXT) {
                    recptr = genr_nam(&ifdisv_nqhead, msgptr->dest_spec.p_name, ifv_offset);
                    if ((recptr->celladdr != 0) && (recptr->celladdr != self)) {
                        msgptr->ipcmsgtype = (int)TXMSG;
                        msgptr->msgsrcdst = recptr->celladdr;
                        Forward(DIRECT, nwov_pid, msgptr);
                        msgptr = 0;
                    }
                }
                if (msgptr != 0) {
                    msgptr->ipcmsgtype = (int)TXSTAT;
                    msgptr->txrx.txstat.status = FAILURE;
                    ifcpmr_txs(msgptr);
                }
                break;
            case MSG_TYP_DIS:
                ifdisr_fail(msgptr);
                break;
            }
            break;

default:
            Forward(NEXT, "error", ipcmsg);
            break;
        }
    }
}
```

PROGRAM LISTING B

```
MODULE NAME    :  %M%

SUBSYSTEM NAME :   NIM

DATE & TIME OF CREATION    :    %E%      %U%

DATE & TIME OF COMPILATION :    %D%      %T%

VERSION :    %R%.%L%

PROGRAMMER :  Bernie Weisshaar

DESCRIPTION :
    Function to send a discovery message.

PARAMETERS PASSED :
    msgptr :   addr of message to be transmitted to named context
    recptr :   addr of corresponding name queue record PARAMETERS RETURNED  : None

*/
static char SrcId[] = "%Z% %M%:%I%";

#include <local/cx.h>
#include "kerntypes.h"
#include "nimkern.h"
#include "nimgen.h"
#include <local/nim/nimif.h>
```

```
44
45
46
47  void ifdisr_txd(msgptr, recptr)
48
49  register IPCSD_TXRXMSG *msgptr;        /* addr of msg to be sent to named context */
50  register IFDISSD_NAMQUE *recptr;       /* addr of corresponding name queue record */
51
52  {
53      extern void genr_copy();
54      extern void genr_lk();
55      extern void genr_free();
56      extern unsigned int ifor_nc();
57      extern void ifcpmr_txs();
58      extern unsigned int hwv_celladdr;
59      extern IPCSD_TXRXMSG *ifdisv_hldhead, *ifdisv_hldtail;
60      extern long nwov_pid;
61      register unsigned int destin;
62      register IPCSD_TXRXMSG *msgptr2;
63
64      if ((destin = ifor_nc()) != hwv_celladdr) {
65          recptr->discinprog = TRUE;
66          genr_lk(&ifdisv_hldhead, &ifdisv_hldtail, msgptr);
67          msgptr2 = (IPCSD_TXRXMSG*)Alloc(sizeof(IPCSD_TXRXMSG) + MAXNAM);
68          genr_copy(msgptr->dest_spec.p_name, msgptr2+1, MAXNAM);
69          msgptr2->ipcmsgtype = (int)TXMSG;
70          msgptr2->msgaddr = (unsigned char*)(msgptr2 + 1);
71          msgptr2->msglen = MAXNAM;
72          msgptr2->msgid = 0;
73          msgptr2->msgtype = MSG_TYP_DIS;
74          msgptr2->msgpri = MAXPRI;
75          msgptr2->msgorg = hwv_celladdr;
76          msgptr2->msgsrcdst = destin;
77          msgptr2->single = TRUE;
78  #ifdef OLDKERN
79          Put(DIRECT, nwov_pid, msgptr2, MAXPRI);
80  #else
81          Put(DIRECT, nwov_pid, msgptr2);
82  #endif
83      } else {
84          recptr->discinprog = FALSE;
85          recptr->celladdr = hwv_celladdr;
86          if (msgptr->msgorg == hwv_celladdr) {
87              msgptr->ipcmsgtype = (int)TXSTAT;
88              msgptr->txrx.txstat.status = FAILURE;
89              ifcpmr_txs(msgptr);
90          } else
91              genr_free(msgptr);
92      }
93  }
```

PROGRAM LISTING C

```
10      MODULE NAME  :  %M%
11
12      SUBSYSTEM NAME :  NIM
13
14      DATE & TIME OF CREATION  :    %E%    %U%
15
16      DATE & TIME OF COMPILATION :  %D%    %T%
17
18      VERSION :       %R%.%L%
19
20      PROGRAMMER  :   Bernie Weisshaar
21
22      DESCRIPTION :
23          Function to send a discovery message.
24
25
26      PARAMETERS PASSED :
27          msgptr :   addr of DIS message that failed
28
29
30      PARAMETERS RETURNED  : None
31
32
33  */
34  static char SrcId[] = "%Z% %M%:%I%";
35
36
37
38  #include <local/cx.h>
```

```
39  #include "kerntypes.h"
40  #include "nimkern.h"
41  #include "nimgen.h"
42  #include <local/nim/nimif.h>
43
44
45
46  void ifdisr_fail(msgptr)
47
48  register IPCSD_TXRXMSG *msgptr; /* addr of DIS message that failed */
49
50  {
51      extern void genr_copy();
52      extern void genr_lk();
53      extern void genr_free();
54      extern IFDISSD_NAMQUE *genr_nam();
55      extern unsigned int ifor_nc();
56      extern void ifcpmr_txs();
57      extern unsigned int hwv_celladdr;
58      extern IPCSD_TXRXMSG *ifdisv_hldhead, *ifdisv_hldtail;
59      extern IFDISSD_NAMQUE *ifdisv_nqhead;
60      extern int ifv_offset;
61      extern long nwov_pid;
62
63      register IFDISSD_NAMQUE *recptr;
64      register IPCSD_TXRXMSG *msgptr2, *msgptr3;
65      register char *namptr;
66
67      if ((msgptr->msgsrcdst = ifor_nc()) != hwv_celladdr) {
68          msgptr->ipcmsgtype = (int)TXMSG;
69          Forward(DIRECT, nwov_pid, msgptr);
70      } else {
71          namptr = (char*)(msgptr + 1);
72          recptr = genr_nam(&ifdisv_nqhead, namptr, ifv_offset);
73          recptr->discinprog = FALSE;
74          recptr->celladdr = hwv_celladdr;
75          msgptr2 = ifdisv_hldhead;
76          while (msgptr2 != 0)
77              if (strncmp(namptr, msgptr2->dest_spec.p_name, MAXNAM) == 0) {
78                  msgptr3 = (IPCSD_TXRXMSG*)(msgptr2->links.next);
79                  genr_ulk(&ifdisv_hldhead, &ifdisv_hldtail, msgptr2);
80                  msgptr2->ipcmsgtype = (int)TXSTAT;
81                  msgptr2->txrx.txstat.status = FAILURE;
82                  ifcpmr_txs(msgptr2);
83                  msgptr2 = msgptr3;
84              } else
85                  msgptr2 = (IPCSD_TXRXMSG*)(msgptr2->links.next);
86          genr_free(msgptr);
87      }
88  }
```

PROGRAM LISTING D

```
10      MODULE NAME   :  %M%
11
12      SUBSYSTEM NAME  :   NIM
13
14      DATE & TIME OF CREATION :    %E%    %U%
15
16      DATE & TIME OF COMPILATION :  %D%    %T%
17
18      VERSION  :    %R%.%L%
19
20      PROGRAMMER  :   Bernie Weisshaar
21
22      DESCRIPTION :
23          Function to accept and deal with message received off LAN.
24
25
26      PARAMETERS PASSED :
27          rxmsg :    address of IPCSD_TXRXMSG structure for received msg
28
29
30      PARAMETERS RETURNED  : None
31
32
33  */
34  static char SrcId[] = "%Z% %M%:%I%";
35
36
37
38  #include <local/cx.h>
39  #include "kerntypes.h"
40  #include "nimkern.h"
```

```
41  #include "nimgen.h"
42  #include <local/nim/nimif.h>
43
44  #define self hwv_celladdr
45
46
47
48  void ifir_rxmsg(rxmsg)
49
50  register IPCSD_TXRXMSG *rxmsg;
51
52  {
53      extern void genr_free();
54      extern unsigned int ifor_nc();
55      extern void ifcpmr_rxm();
56      extern bool ifcpmr_nam();
57      extern unsigned int hwv_celladdr;
58      extern long iftov_pid;
59      extern long ifdisv_pid;
60      extern long nwov_pid;
61      register IPCSD_TXRXMSG *rxmsg2;
62      register MSG *msgadd;
63
64      if (rxmsg->msgorg == self)
65          if ((rxmsg->msgtype == MSG_TYP_CPMMSG) && (((MSG*)(rxmsg->msgaddr))->mode == (unsigned
            char)DIRECT))
66              ifcpmr_rxm(rxmsg);
67          else
68  #ifdef OLDKERN
69              Put(DIRECT, iftov_pid, rxmsg, MAXPRI);
70  #else
71              Put(DIRECT, iftov_pid, rxmsg);
72  #endif
73      else
74          switch (rxmsg->msgtype) {
75          case MSG_TYP_CPMMSG:
76              msgadd = (MSG*)(rxmsg->msgaddr);
77              switch (msgadd->mode) {
78              case DIRECT:
79                  ifcpmr_rxm(rxmsg);
80                  break;
81              case NEXT:
82              case ALL:
83              case LOCAL:
84                  if (!ifcpmr_nam(rxmsg->dest_spec.p_name)) {
85                      rxmsg->ipcmsgtype = (int)TXMSG;
86                      rxmsg->msgtype = MSG_TYP_CPMREJ;
87  #ifdef OLDKERN
88                      Put(DIRECT, nwov_pid, rxmsg, MAXPRI);
89  #else
90                      Put(DIRECT, nwov_pid, rxmsg);
91  #endif
92                  } else {
93                      rxmsg2 = (IPCSD_TXRXMSG*)Alloc(sizeof(IPCSD_TXRXMSG) + rxmsg->msglen);
94                      *rxmsg2 = *rxmsg;
95                      rxmsg2->ipcmsgtype = (int)TXMSG;
96                      rxmsg2->single = TRUE;
97                      rxmsg2->msgaddr = (unsigned char*)(rxmsg2 + 1);
98                      genr_copy(rxmsg->msgaddr, rxmsg2->msgaddr, rxmsg->msglen);
99  #ifdef OLDKERN
100                     Put(DIRECT, ifdisv_pid, rxmsg2, MAXPRI);
101 #else
102                     Put(DIRECT, ifdisv_pid, rxmsg2);
103 #endif
104                     ifcpmr_rxm(rxmsg);
105                 }
106                 break;
107             }
108             break;
109         case MSG_TYP_CPMREJ:
110 #ifdef OLDKERN
111             Put(DIRECT, ifdisv_pid, rxmsg, MAXPRI);
112 #else
113             Put(DIRECT, ifdisv_pid, rxmsg);
114 #endif
115             break;
116         case MSG_TYP_DIS:
117             rxmsg->ipcmsgtype = (int)TXMSG;
118             if (ifcpmr_nam(rxmsg + 1)) {
119                 rxmsg->msgtype = MSG_TYP_DISRSP;
120                 rxmsg->msgsrcdst = rxmsg->msgorg;
121 #ifdef OLDKERN
122                 Put(DIRECT, nwov_pid, rxmsg, MAXPRI);
123 #else
```

```
124                Put(DIRECT, nwov_pid, rxmsg);
125  #endif
126            } else
127                if ((rxmsg->msgsrcdst = ifor_nc()) != hwv_celladdr)
128  #ifdef OLDKERN
129                Put(DIRECT, nwov_pid, rxmsg, MAXPRI);
130  #else
131                Put(DIRECT, nwov_pid, rxmsg);
132  #endif
133            else
134                genr_free(rxmsg);
135        break;
136     case MSG_TYP_DISRSP:
137  #ifdef OLDKERN
138        Put(DIRECT, iftov_pid, rxmsg, MAXPRI);
139  #else
140        Put(DIRECT, iftov_pid, rxmsg);
141  #endif
142        break;
143     case MSG_TYP_UPD:
144  #ifdef OLDKERN
145        Put(DIRECT, ifdisv_pid, rxmsg, MAXPRI);
146  #else
147        Put(DIRECT, ifdisv_pid, rxmsg);
148  #endif
149        break;
150     }
151  }
```

PROGRAM LISTING E

```
10       MODULE NAME   :   %M%
11
12       SUBSYSTEM NAME :   NIM
13
14       DATE & TIME OF CREATION   :    %E%      %U%
15
16       DATE & TIME OF COMPILATION :   %D%      %T%
17
18       VERSION  :    %R%.%L%
19
20       PROGRAMMER  :   Bernie Weisshaar
21
22       DESCRIPTION :
23           Process to keep track of which visible processes reside on
24       this cell.
25
26
27       PARAMETERS PASSED  : None
28
29
30       PARAMETERS RETURNED : None
31
32
33   */
34   static char SrcId[] = "%Z% %M%:%I%";
35
36
37
38   #include <local/cx.h>
39   #include <local/os/clock.h>
40   #include "nimkern.h"
41   #include "nimgen.h"
42   #include <local/nim/nimif.h>
43
44   #define RECPERSEG 20
45
46
47   struct SignalMsg if1_signalmsg = {
48       "everylen",
49       0,          /* year */
50       0,          /* month */
51       0,          /* day */
52       0,          /* day of week */
53       0,          /* hours */
54       0,          /* minutes */
55       10,         /* seconds */
56       "ifconp"
57   };
58
59
60   struct SignalMsg if2_signalmsg = {
61       "cancel",
```

```
62          0,              /* year */
63          0,              /* month */
64          0,              /* day */
65          0,              /* day of week */
66          0,              /* hours */
67          0,              /* minutes */
68          10,             /* seconds */
69          "ifconp"
70      };
71
72
73      int trg_ifconp_eg;
74      int trg_ifconp_lg;
75
76
77      #ifdef CXE
78      int ifv_offset;                 /* offset to name field */
79      long hwchamgr_pid;              /* pid of hwchamgr */
80      long hwchbmgr_pid;              /* pid of hwchbmgr */
81      long hwchcmgr_pid;              /* pid of hwchcmgr */
82      long nwov_pid;                  /* pid of nwop */
83      int hwv_celladdr;               /* this cell's physical address */
84      #else
85      extern int ifv_offset;          /* offset to name field */
86      extern long hwchamgr_pid;       /* pid of hwchamgr */
87      extern long hwchbmgr_pid;       /* pid of hwchbmgr */
88      extern long hwchcmgr_pid;       /* pid of hwchcmgr */
89      extern long nwov_pid;           /* pid of nwop */
90      extern int hwv_celladdr;        /* this cell's physical address */
91      #endif
92
93
94
95      PROCESS(ifconp)
96      {
97          extern void genr_copy();
98          extern void genr_prnt();
99          extern void genr_alk();
100         extern void genr_lk();
101         extern void genr_ulk();
102         extern void genr_free();
103         extern IFCONSD_NAMQUE *genr_gar();
104         extern IFCONSD_NAMQUE *genr_nam();
105         extern unsigned int ifor_nc();
106
107         IFCONSD_NAMQUE *ifconv_avhead;      /* available queue head pointer */
108         IFCONSD_NAMQUE *ifconv_avtail;      /* available queue tail pointer */
109         IFCONSD_NAMQUE *ifconv_nqhead;      /* resident process name queue head pointer */
110         IFCONSD_NAMQUE *ifconv_nqtail;      /* resident process name queue tail pointer */
111         register IFCONSD_NAMQUE *ptr;       /* pointer into resident process name queue */
112         register IPCSD_TXRXMSG *tptr;       /* pointer to txmsg IPC message */
113         register int *ipcmsg;               /* pointer to received IPC message */
114         unsigned int destin;                /* addr of cell to be sent UPD message */
115         bool initialized;                   /* flag indicating receipt of INIT message */
116         bool signalon;                      /* flag indicating whether signaling enabled */
117
118         ifconv_nqhead = ifconv_nqtail = 0;
119         ifconv_avhead = ifconv_avtail = 0;
120         signalon = initialized = FALSE;
121
122         FOREVER {
123             trg_ifconp_eg = -1;
124     #ifdef OLDKERN
125             ipcmsg = Get(NULL, NULL);
126     #else
127             ipcmsg = (int*)Get(NULL, NULL, NULL);
128     #endif
129             trg_ifconp_lg = *ipcmsg;
130             if (strcmp("awake", ipcmsg) == 0) {
131                 Free(ipcmsg);
132                 genr_prnt("ifconp: awake\n");
133                 if ((destin = ifor_nc()) != hwv_celladdr) {
134                     for (ptr = ifconv_nqhead; ptr != 0; ptr = (IFCONSD_NAMQUE*)(ptr->links.next))
135                         if (!ptr->sent) {
136                             tptr = (IPCSD_TXRXMSG*)Alloc(sizeof(IPCSD_TXRXMSG) + MAXNAM);
137                             tptr->ipcmsgtype = (int)TXMSG;
138                             tptr->msgaddr = (unsigned char*)(tptr+1);
139                             tptr->msglen = MAXNAM;
140                             tptr->msgtype = MSG_TYP_UPD;
141                             tptr->msgpri = MAXPRI;
142                             tptr->msgorg = hwv_celladdr;
143                             tptr->msgsrcdst = destin;
144                             tptr->single = TRUE;
145                             genr_copy(ptr->name, tptr+1, MAXNAM);
146     #ifdef OLDKERN
```

```
147                         Put(DIRECT, nwov_pid, tptr, MAXPRI);
148 #else
149                         Put(DIRECT, nwov_pid, tptr);
150 #endif
151                         ptr->sent = TRUE;
152                     }
153                     if (signalon) {
154                         ipcmsg = (int*)Alloc(sizeof(struct SignalMsg));
155                         *(struct SignalMsg*)ipcmsg = if2_signalmsg;
156 #ifdef OLDKERN
157                         Put(NEXT, "signal", ipcmsg, MAXPRI);
158 #else
159                         Put(NEXT, "signal", ipcmsg);
160 #endif
161                         signalon = FALSE;
162                     }
163                 }
164         } else {
165             switch (*ipcmsg) {
166                 case INIT:
167 #ifdef CXE
168                     ifv_offset = ((IPCSD_INIT*)(ipcmsg))->ifv_offset;
169                     hwchamgr_pid = ((IPCSD_INIT*)(ipcmsg))->hwchamgr_pid;
170                     hwchbmgr_pid = ((IPCSD_INIT*)(ipcmsg))->hwchbmgr_pid;
171                     hwchcmgr_pid = ((IPCSD_INIT*)(ipcmsg))->hwchcmgr_pid;
172                     nwov_pid = ((IPCSD_INIT*)(ipcmsg))->nwop_pid;
173                     hwv_celladdr = ((IPCSD_INIT*)(ipcmsg))->hwv_celladdr;
174 #endif
175                     Free(ipcmsg);
176                     genr_prnt("ifconp: initialized\n");
177                     initialized = TRUE;
178                     ipcmsg = (int*)Alloc(sizeof(struct SignalMsg));
179                     *(struct SignalMsg*)ipcmsg = if1_signalmsg;
180 #ifdef OLDKERN
181                     Put(NEXT, "signal", ipcmsg, MAXPRI);
182 #else
183                     Put(NEXT, "signal", ipcmsg);
184 #endif
185                     signalon = TRUE;
186                     break;
187                 case ECHO:
188                     Reply(ipcmsg, ipcmsg);
189                     break;
190                 case DBPRINT:                      /* start of code for DBPRINT */
191                     printf("signalon=%d\n", signalon);
192                     printf("\nifconv_nqhead=%x, ifconv_nqtail=%x\n", ifconv_nqhead, ifconv_nqtail);
193                     if (ifconv_nqhead != 0) {
194                         printf("count   sent   process_name\n");
195                         for (ptr = ifconv_nqhead; ptr != 0; ptr = (IFCONSD_NAMQUE*)(ptr->links.next))
196                             printf("%3d     %1d    %s\n", ptr->count, ptr->sent, ptr->name);
197                     }
198                     Free(ipcmsg);
199                     break;                         /* end of code for DBPRINT */
200                 case CONCRE:
201                     ptr = genr_nam(&ifconv_nqhead, ((IPCSD_CONTEXT*)(ipcmsg))->name, ifv_offset);
202                     if (ptr != 0)
203                         Free(ipcmsg);
204                     else {
205                         ptr = genr_gar(&ifconv_avhead, &ifconv_avtail, sizeof(IFCONSD_NAMQUE), RECPERSEG);
206                         ptr->count = 0;
207                         ptr->sent = FALSE;
208                         genr_copy(((IPCSD_CONTEXT*)(ipcmsg))->name, ptr->name, MAXNAM);
209                         genr_alk(&ifconv_nqhead, &ifconv_nqtail, ptr, (int)(ptr->name) - (int)ptr);
210                         Free(ipcmsg);
211                         if (initialized)
212                             if ((destin = ifor_nc()) != hwv_celladdr) {
213                                 tptr = (IPCSD_TXRXMSG*)Alloc(sizeof(IPCSD_TXRXMSG) + MAXNAM);
214                                 tptr->ipcmsgtype = (int)TXMSG;
215                                 tptr->msgaddr = (unsigned char*)(tptr+1);
216                                 tptr->msglen = MAXNAM;
217                                 tptr->msgtype = MSG_TYP_UPD;
218                                 tptr->msgpri = MAXPRI;
219                                 tptr->msgorg = hwv_celladdr;
220                                 tptr->msgsrcdst = destin;
221                                 tptr->single = TRUE;
222                                 genr_copy(ptr->name, tptr+1, MAXNAM);
223 #ifdef OLDKERN
224                                 Put(DIRECT, nwov_pid, tptr, MAXPRI);
225 #else
226                                 Put(DIRECT, nwov_pid, tptr);
227 #endif
228                                 ptr->sent = TRUE;
229                             } else
230                                 if (!signalon) {
```

```
                    ipcmsg = (int*)Alloc(sizeof(struct SignalMsg));
                    *(struct SignalMsg*)ipcmsg = if1_signalmsg;
#ifdef OLDKERN
                    Put(NEXT, "signal", ipcmsg, MAXPRI);
#else
                    Put(NEXT, "signal", ipcmsg);
#endif
                    signalon = TRUE;
                }
            }
            (ptr->count)++;
            break;
        case IFTO:
            ptr = genr_nam(&ifconv_nqhead, (IPCSD_TXRXMSG*)ipcmsg + 1, ifv_offset);
            if (ptr == 0)
                genr_free(ipcmsg);
            else
                if ((destin = ifor_nc()) != hwv_celladdr) {
                    ((IPCSD_TXRXMSG*)ipcmsg)->ipcmsgtype = (int)TXMSG;
                    ((IPCSD_TXRXMSG*)ipcmsg)->msgsrcdst = destin;
                    Forward(DIRECT, nwov_pid, ipcmsg);
                    ptr->sent = TRUE;.
                } else {
                    genr_free(ipcmsg);
                    ipcmsg = (int*)Alloc(sizeof(struct SignalMsg));
                    *(struct SignalMsg*)ipcmsg = if1_signalmsg;
#ifdef OLDKERN
                    Put(NEXT, "signal", ipcmsg, MAXPRI);
#else
                    Put(NEXT, "signal", ipcmsg);
#endif
                    signalon = TRUE;
                    ptr->sent = FALSE;
                }
            break;
        case CONDEL:
            ptr = genr_nam(&ifconv_nqhead, ((IPCSD_CONTEXT*)(ipcmsg))->name, ifv_offset);
            if (ptr != 0)
                if (--(ptr->count) == 0) {
                    genr_ulk(&ifconv_nqhead, &ifconv_nqtail, ptr);
                    genr_lk(&ifconv_avhead, &ifconv_avtail, ptr);
                }
            Free(ipcmsg);
            break;
        case NAMESRCH:
            ptr = genr_nam(&ifconv_nqhead, ((IPCSD_CONTEXT*)(ipcmsg))->name, ifv_offset);
            ((IPCSD_NAMESRCH*)(ipcmsg))->exists = (ptr != 0);
            Reply(ipcmsg, ipcmsg);
            break;
        default:
            Forward(NEXT, "error", ipcmsg);
            break;
        }
    }
}
```

What is claimed is:

1. A method of locating processes in a distributed data processing system, said system comprising a plurality of individual cells and at least two processes resident on different ones of said cells, said method comprising the steps of:

(a) generating a request by a first process in a first one of said cells to find the location of a second process not resident on said first cell;
(b) transmitting said request to a different one of said cells;
(c) determining whether said second process is resident on said different cell; and
(d) if said second process is resident on said different cell, informing said first cell of the location of said different cell.

2. The method of locating processes as recited in claim 1, and further comprising the step of:

(e) if said second process is not resident on said different cell, repeating steps (b) and (c) until either the location of said second process is found, in which case the first cell is informed of the location of said different cell, or until all other cells in the system have been queried without finding the location of said second process, in which case the first cell is informed that the second process cannot be found.

3. A method of locating processes in a distributed data processing system, said system comprising a plurality of individual cells and at least two processes resident on different ones of said cells, said method comprising the steps of:

(a) providing in at least one of said cells a table of non-resident processes;
(b) generating a request by a first process in said one cell to find the location of a second process identified only by name, said second process not resident on said first cell;
(c) transmitting said request to a different one of said cells;
(d) determining whether said second process is resident on said different cell; and
(e) if said second process is resident on said different cell, storing the location of said different cell in said table.

4. The method of locating processes as recited in claim 3, wherein said table contains only one entry for said second process.

5. The method of locating processes as recited in claim 3, and further comprising the step of:
(f) if said second process is not resident on said different cell, repeating steps (c) and (d) until either the location of said second process is found, in which case the location of said different cell is stored in said table, or until all other cells in the system have been queried without finding the location of said second process, in which case the first cell is informed that the second process cannot be found.

6. A method of communicating between processes in a distributed data processing system, said system comprising a plurality of individual cells and at least two processes resident on different ones of said cells, said method comprising the steps of:
(a) providing in at least a first one of said cells a table of non-resident processes;
(b) generating a request by a first process in said first cell to transmit a message to a second process identified only by name, said second process not resident on said first cell;
(c) looking up the location of said second process in said table in said first cell; and
(d) transmitting said message to the cell containing said second process.

7. The method of communicating between processes as recited in claim 6, and further comprising the step of:
(e) if said second process is no longer resident on said different cell, so informing said first cell.

8. The method of communicating between processes as recited in claim 6, wherein said table contains only one entry for said second process.

9. A method of communicating between processes in a distributed data processing system, said system comprising a plurality of individual cells and at least two processes resident on different ones of said cells, said method comprising the steps of:
(a) providing in at least a first one of said cells a table of non-resident processes, each entry in said table comprising a first portion indicating the name of a process and a second portion indicating the location of a cell where said process is resident;
(b) generating a request by a first process in said first cell to transmit a message to a second process identified only by name, said second process not resident on said first cell;
(c) looking up the location of said second process in said table in said first cell and finding the location of the cell where said second process is resident; and
(d) transmitting said message to the cell containing said second process.

10. The method of communicating between processes as recited in claim 9, and further comprising the step of:
(e) if said second process is no longer resident on said different cell, so informing said first cell.

11. The method of communicating between processes as recited in claim 9, wherein said table contains only one entry for said second process.

* * * * *